US007018508B2

(12) United States Patent
Yancey et al.

(10) Patent No.: US 7,018,508 B2
(45) Date of Patent: Mar. 28, 2006

(54) PROCESS FOR PRODUCING DRIED SINGULATED CROSSLINKED CELLULOSE PULP FIBERS

(75) Inventors: Michael J. Yancey, Puyallup, WA (US); Brian Wester, Sumner, WA (US); Michael David Vrbanac, Seattle, WA (US); Ramon Charles Dezutter, Milton, WA (US)

(73) Assignee: Weyerhaeuser Company, Federal Way, WA (US)

( * ) Notice: Subject to any disclaimer, the term of this patent is extended or adjusted under 35 U.S.C. 154(b) by 386 days.

(21) Appl. No.: 10/051,872

(22) Filed: Jan. 16, 2002

(65) Prior Publication Data

US 2003/0188838 A1 Oct. 9, 2003

Related U.S. Application Data

(63) Continuation-in-part of application No. 09/998,143, filed on Oct. 30, 2001, now Pat. No. 6,748,671.

(51) Int. Cl.
*D21C 9/00* (2006.01)

(52) U.S. Cl. ............... 162/9; 162/157.6; 162/100; 8/116.1; 34/427

(58) Field of Classification Search ............... 162/9, 162/157.6, 100, 158, 181.1–181.2, 182; 8/116.1, 8/120; 536/36, 56; 34/427, 329, 331, 356–358
See application file for complete search history.

(56) References Cited

U.S. PATENT DOCUMENTS

| 2,991,946 | A | 7/1961 | Croft |
|---|---|---|---|
| 3,268,954 | A | 8/1966 | Joa |
| 3,415,456 | A | 12/1968 | Bidwell |
| 3,440,135 | A | 4/1969 | Chung |
| 3,491,953 | A | 1/1970 | Stephanoff |
| 3,543,351 | A | 12/1970 | George |
| 3,554,862 | A | 1/1971 | Hervey et al. |
| 3,554,863 | A | 1/1971 | Hervey et al. |
| 3,667,131 | A | 6/1972 | Stephanoff |
| 3,802,089 | A | 4/1974 | Stephanoff |
| 3,819,470 | A * | 6/1974 | Shaw et al. ............... 162/157.6 |
| 3,898,157 | A | 8/1975 | Hooper |
| 3,945,130 | A | 3/1976 | Stephanoff |
| 3,974,574 | A | 8/1976 | Van Vliet et al. |
| 3,977,089 | A | 8/1976 | Forster et al. |
| 3,987,968 | A | 10/1976 | Moore et al. |
| 4,033,853 | A | 7/1977 | Hann |
| 4,035,147 | A * | 7/1977 | Sangenis et al. ............... 8/116.4 |
| 4,036,679 | A | 7/1977 | Back et al. |
| 4,065,347 | A | 12/1977 | Aberg et al. |
| 4,098,006 | A | 7/1978 | Maffet |
| 4,099,336 | A | 7/1978 | Maffet |
| 4,110,195 | A | 8/1978 | Harding |
| 4,121,349 | A | 10/1978 | Maffet |
| 4,128,946 | A | 12/1978 | Maffet |
| 4,161,825 | A | 7/1979 | Maffet |
| 4,183,146 | A | 1/1980 | Tsukamoto et al. |
| 4,198,004 | A | 4/1980 | Albus et al. |
| 4,204,055 | A | 5/1980 | Lesas et al. |
| 4,214,375 | A | 7/1980 | Albus et al. |
| 4,226,027 | A | 10/1980 | Albus |
| 4,253,822 | A | 3/1981 | Marsh |
| 4,259,958 | A | 4/1981 | Goodbar |
| 4,347,128 | A | 8/1982 | Barnscheidt |
| 4,489,503 | A | 12/1984 | Browne et al. |
| 4,528,995 | A | 7/1985 | Korte et al. |
| 4,547,263 | A | 10/1985 | Quame |
| 4,557,800 | A | 12/1985 | Kinsley, Jr. |
| 4,594,793 | A | 6/1986 | Carlson |
| 4,613,627 | A | 9/1986 | Sherman et al. |
| 4,650,127 | A | 3/1987 | Radwanski et al. |
| 4,668,339 | A | 5/1987 | Terry |
| 4,671,860 | A | 6/1987 | Huddleston, Jr. et al. |
| 4,701,857 | A | 10/1987 | Robinson |
| 4,718,178 | A | 1/1988 | Whipple |
| 4,799,961 | A | 1/1989 | Friberg |
| 6,436,231 | B1 | 8/2002 | Graef et al. |
| 6,620,293 | B1 * | 9/2003 | Sears et al. ............... 162/157.6 |
| 6,620,865 | B1 * | 9/2003 | Westland et al. ............... 524/13 |
| 2003/0121623 | A1 * | 7/2003 | Westland et al. ............... 162/9 |
| 2003/0141028 | A1 * | 7/2003 | Vrbanac et al. ............... 162/157.6 |
| 2003/0155087 | A1 * | 8/2003 | Sears et al. ............... 162/9 |

(Continued)

FOREIGN PATENT DOCUMENTS

CA 947915 5/1974

(Continued)

OTHER PUBLICATIONS

Bentley, S., "An Apparatus for Producing Air-Formed Handsheets," *Pulp and Paper Research Institute of Canada*, pp. A11-A17.

(Continued)

*Primary Examiner*—José A. Fortuna
(74) *Attorney, Agent, or Firm*—Christensen O'Connor Johnson Kindness PLLC

(57) ABSTRACT

This invention provides a dried singulated crosslinked cellulose pulp fiber product as well as an apparatus and a method for forming singulated, crosslinked, and dried fibers. In accordance with the process, a feed pulp containing a crosslinker is delivered to a jet drier. The jet drier singulates and dries the feed pulp. The singulated and dried fibers are collected from the jet drier. The feed pulp may be further treated with a treatment substance. The jet drier may be maintained at negative pressure. The product fibers may have low knot count, a low fines count, as well improved kink, curl and twist. The apparatus for carrying out the process may include a pretreatment station for supplying the treatment substance, a pulp feed device designed for pulp, a pulp feed device designed for pulp and foam suspensions, and/or a fiber separation station having a vacuum conveyor.

28 Claims, 11 Drawing Sheets

U.S. PATENT DOCUMENTS

| | | | |
|---|---|---|---|
| 2003/0188449 A1* | 10/2003 | Yancey et al. | 34/221 |
| 2003/0188838 A1* | 10/2003 | Yancey et al. | 162/9 |
| 2003/0192659 A1* | 10/2003 | Yancey et al. | 162/9 |
| 2004/0084159 A1* | 5/2004 | Hamed et al. | 162/9 |
| 2004/0177935 A1* | 9/2004 | Hamed et al. | 162/9 |
| 2004/0177936 A1* | 9/2004 | Vrbanac et al. | 162/9 |
| 4,919,340 A | 4/1990 | Gerber | |
| 5,007,181 A | 4/1991 | Jackson et al. | |
| 5,137,537 A * | 8/1992 | Herron et al. | 8/120 |
| 5,176,793 A | 1/1993 | Kurtz | |
| 5,181,987 A | 1/1993 | Breuker et al. | |
| 5,183,707 A * | 2/1993 | Herron et al. | 428/364 |
| 5,188,298 A | 2/1993 | Gerber | |
| 5,225,047 A | 7/1993 | Graef et al. | |
| 5,252,275 A | 10/1993 | Sultze et al. | |
| 5,266,211 A | 11/1993 | Breuker et al. | |
| 5,279,046 A | 1/1994 | Vincent | |
| 5,437,417 A * | 8/1995 | Kammann | 242/541.1 |
| 5,437,418 A | 8/1995 | Graef et al. | |
| 5,527,432 A | 6/1996 | Leuthold et al. | |
| 5,556,976 A | 9/1996 | Jewell | |
| 5,564,635 A | 10/1996 | Terada et al. | |
| 5,634,281 A | 6/1997 | Nugent | |
| 5,643,359 A | 7/1997 | Soroushian et al. | |
| 5,709,774 A | 1/1998 | Naieni | |
| 5,722,603 A | 3/1998 | Costello et al. | |
| 5,800,418 A * | 9/1998 | Ahr | 604/368 |
| 5,816,507 A | 10/1998 | Skali Lami et al. | |
| 5,873,979 A * | 2/1999 | Naieni | 162/157.6 |
| 5,913,588 A | 6/1999 | Legros et al. | |
| 5,989,335 A | 11/1999 | Soroushian et al. | |
| 6,074,524 A * | 6/2000 | Wu et al. | 162/100 |
| 6,159,335 A | 12/2000 | Owens et al. | |
| 6,171,443 B1 | 1/2001 | Goettmann et al. | |
| 6,184,271 B1* | 2/2001 | Westland et al. | 524/13 |
| 6,296,736 B1 | 10/2001 | Hsu et al. | |
| 6,296,737 B1 | 10/2001 | Wu et al. | |
| 6,383,336 B1 | 5/2002 | Shannon | |

FOREIGN PATENT DOCUMENTS

| | | |
|---|---|---|
| CA | 993618 | 7/1976 |
| CA | 1017519 | 9/1977 |
| CA | 1124451 | 6/1982 |
| EP | 0 773 768 B1 | 1/2000 |
| EP | 0 845 966 B1 | 3/2000 |
| GB | 888845 * | 2/1962 |
| GB | 1 405 079 | 9/1975 |
| WO | WO 94/10953 A1 | 5/1994 |

OTHER PUBLICATIONS

Larsson, O. and B. Lindström, "Recent Developments in Pulp Drying," *World Pulp and Paper Week*, Stockholm, Jun. 4-7, 1996, pp. 875-884.

Sarigaphuti, M., et al., "Shrinkage Cracking and Durability Characteristics of Cellulose Fiber Reinforced Concrete," *ACI Materials Journal* 90(4):309-318, Jul.-Aug. 1993.

* cited by examiner

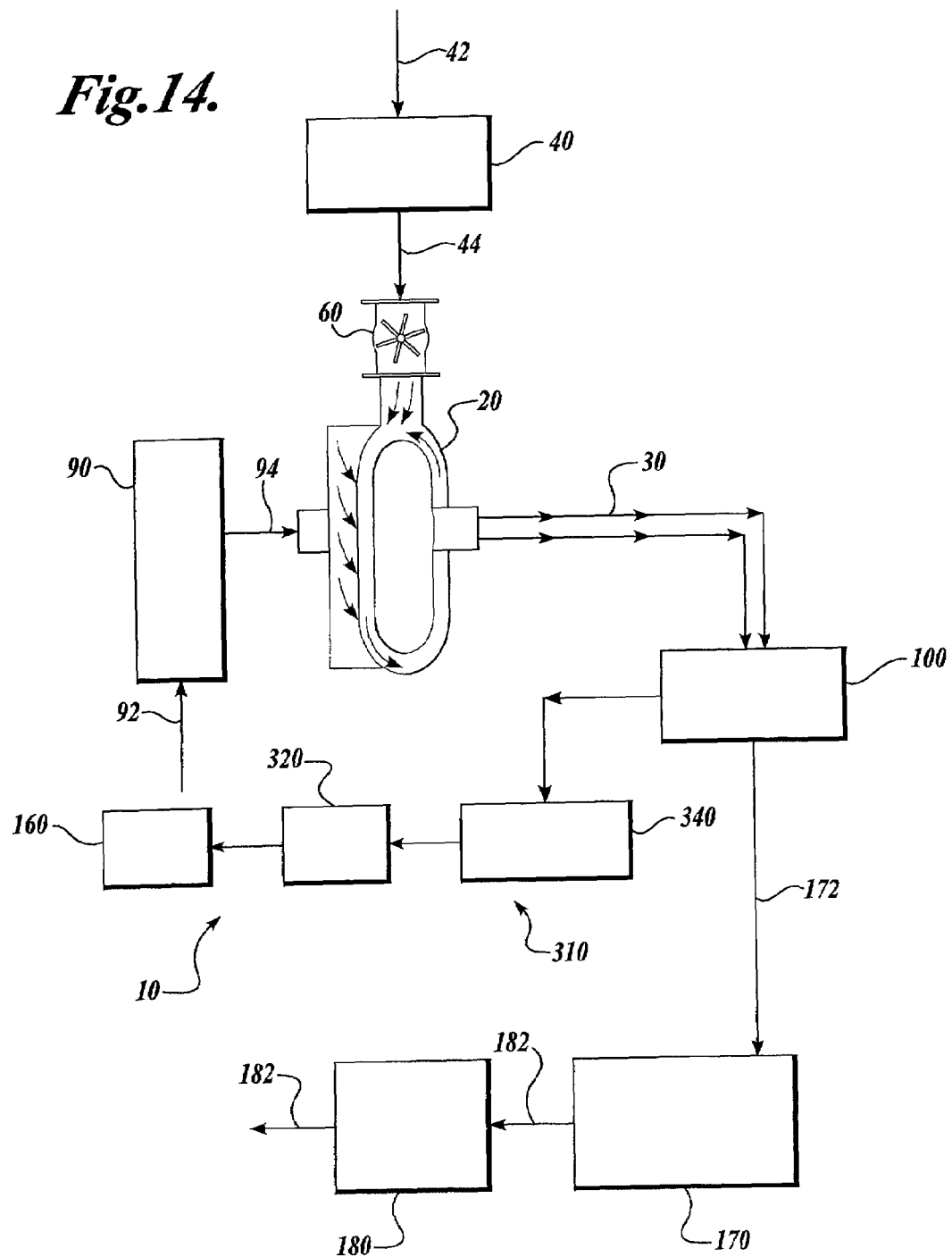

US 7,018,508 B2

PROCESS FOR PRODUCING DRIED SINGULATED CROSSLINKED CELLULOSE PULP FIBERS

CROSS-REFERENCE TO RELATED APPLICATION

This application is a continuation-in-part of prior application Ser. No. 09/998,143 filed Oct. 30, 2001, now U.S. Pat. No. 6,748,671.

FIELD OF THE INVENTION

The present invention relates to a dried singulated crosslinked cellulose pulp fiber product as well as a process and apparatus for producing dried singulated crosslinked cellulose pulp fibers, and more particularly, a process and apparatus for producing dried singulated crosslinked cellulose pulp fibers including the step of using a jet drier to dry the pulp.

BACKGROUND OF THE INVENTION

Dried singulated cellulose pulp fibers are desirable for many products from absorbent personal articles to a reinforcer in concrete. Currently, in the most common process of making singulated fibers, a roll of conventional pulp fibers is hammermilled into singulated fibers. This process is energy and time intensive, requiring many steps and pieces of processing equipment. Each piece of processing equipment requires a significant capital expenditure and occupies valuable factory floor space. Further, the current hammermilling process often produces fibers with undesirable physical properties, such as low kink, curl, and twist.

This dry singulated pulp will also contain knots of fiber, sometimes referred to as nits or nodules. Knots are fiber clumps that remain strongly adhered to one another as can be seen by placing a small portion of pulp into a clear beaker of water and stirring the water to mix the fibers. Most of the fiber will mix into the water as singular fibers, however there will be fiber clumps that are readily visible. The fiber clumps or knots are undesirable by-products of the hammermilling process. The amount of knots in a pulp that has been hammermilled can be quantified by using a screening system with acoustical energy used as the means to classify the fiber into amounts of knots, accepts and fines. It is desirable to have low knots and fines and high accepts where the accepts are the singulated fibers.

Canadian Patent No. 993618 (Estes, 1976) describes a process for producing a low density fluff pad or batt from individual fibers that have significant kink and interlocking to provide improved batt strength and higher bulk. In accordance with the process, wet pulp is separated into individual fibers during the drying stage. The process uses fluid jet drying equipment that employs air-jets or steam-jets for separating the fibers. The fibers are laid on a perforated screen upon exiting from the jet drier. The process of the Canadian patent produces a mat of interlocked fibers.

Crosslinked fibers are conventionally produced by wetting an already dried roll of conventional pulp fibers with a solution containing a crosslinker prior to hammermilling. The hammermilled pulp containing a crosslinker is then run through a flash drier and further heated in an oven to complete the crosslinking process. This crosslinked pulp has a knot content that is greater than 15%. It is desirable to have a lower amount of knots in crosslinked pulp. Also this conventional process is energy intensive and therefore expensive because the pulp is dried before it is rolled, then hammermilled in wet form with crosslinker, then dried again.

Flash drier systems have been used to directly dry dewatered never dried pulp. The use of flash driers to directly dry dewatered never dried pulp, however, produces a dried pulp with a high amount of knots. Typical knot amounts for flash drying of never dried pulps are 30–40%. Crosslinker containing pulp dried in this manner also results in a knot content similar to or exceeding this level. An overview of a commercial flash drier, the Flakt Flash Drier, and typical flash drier equipment installation is provided by Larsson and Lindstrom, 1996 ("Recent Developments in Pulp Drying", Larson, O; Lindstrom, B, The World of Pulp and Paper Week, 5th International Conference on New Available Techniques, Jun. 4–7, 1996, Stockholm, Sweden).

SUMMARY OF THE INVENTION

This invention provides a dried singulated crosslinked cellulose pulp fiber product as well as an apparatus and a method for forming singulated, crosslinked, and dried fibers that have a relatively low knot content. In accordance with the process, wet pulp containing a crosslinker and air are introduced into a jet drier. The pulp is dried in the jet drier to form singulated pulp fibers. The pulp is removed from the jet drier and separated from the air. The process may be used on several types of feed pulp and on further treated feed pulp. The product formed by the process has advantageous properties such as a low knot count, a low fines count, as well as improved kink, curl and twist. The apparatus for carrying out the process may include a pretreatment station for supplying a treatment substance, a pulp feed device designed only for pulp, a pulp feed device designed for suspensions of pulp in foam, and/or a fiber separation station having a vacuum conveyor.

In accordance with the process described above, the wet pulp containing a crosslinker treatment substance, may be further treated with a treatment substance before drying to reduce the knot content of the pulp fibers. The process also includes producing singulated pulp fibers by introducing wet pulp and air into a jet drier through a rotary airlock. The rotary airlock has vanes and a housing, with the end of the vanes being spaced from the housing by a distance sufficient to prevent wet fibers from clogging the airlock. The process includes producing singulated pulp fibers by withdrawing the fibers from said jet drier in an air stream at a velocity sufficient to prevent the fibers from interlocking and knotting. The process also includes producing singulated pulp fibers by withdrawing the pulp fibers from an outlet from said jet drier under a partial vacuum.

The pulp product includes singulated, crosslinked and jet dried fibers with a knot count equal to or less than preferably 15%, more preferably 10%, even more preferably 5%, and most preferably 2%. The product may be further treated with a treatment substance selected from the group consisting of a surfactant and a mineral particulate. The product of singulated, crosslinked, and jet dried fibers can be incorporated into concrete, an absorbent article, a plastic product, a paper product, or a filter product.

The drying system for the processing of pulp into singulated, crosslinked and dried fibers includes a jet drier, a pulp supply station, an air supply station, an outlet flow conduit and a fiber separation station. The jet drier has a jet conduit, a manifold for air intake into the jet conduit, a pulp intake for delivery of pulp into the jet conduit, and a fiber outlet for removal of singulated and dried fibers, outlet air and fines from the jet conduit. The pulp supply station is coupled to the pulp intake for supplying a feed pulp to the pulp intake. The pulp supply station includes a treatment supply source for delivering a treatment substance to the pulp. The air supply station is coupled to the manifold for delivering air to the manifold. The outlet flow conduit is coupled to the fiber outlet for the transport of the fibers, outlet air and fines from the jet conduit. The fiber separation station is coupled to the outlet flow conduit for separating the fibers from the outlet air.

The present invention thus provides a dried singulated crosslinked cellulose pulp fiber product as well as an apparatus and a method that enable forming singulated, crosslinked, and dried fibers. The process may take wet pulp directly from a pulp mill and produce a singulated product from the never-dried pulp by using a drying process that singulates the pulp directly. This process forms singulated crosslinked fibers with greater kink, curl, and individual twist than hammermilled fibers. A further advantage is the ability of the present invention to produce crosslinked fibers having a low fiber interlock, knot and fines content. Other advantages are the further treatments, in addition to crosslinking, that can be performed on the pulp that are difficult or impossible to perform on a roll of dried pulp. Treatments can be done on the never-dried pulp that reduce the amount of knots, increase production rate, and/or form fibers having desirable characteristics.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 14 is a schematic diagram of the drying system of the present invention including a curing oven.

DETAILED DESCRIPTION OF THE PREFERRED EMBODIMENT

The present invention provides for processes and apparatus for the drying, treatment, and singulation of pulp into individual fibers with low interlocked fibers, knots or nodules. As used herein the term "dried" in regards to fibers, is a term of art generally indicating a weight percentage of water between 2% and 10%, but may fall above or below this range. As used herein the term "air" is not limited to pure air but may include any gas consistent with the present invention. As used herein the term "consistency" means the percentage of solids content of a liquid and solid mixture. The specific examples set forth below are directed to the drying, treatment, and singulation of cellulose pulp fibers. However, it should be understood that the present invention is also suitable for use in processing other types of natural fibers and/or synthetic fibers.

Figure 1:
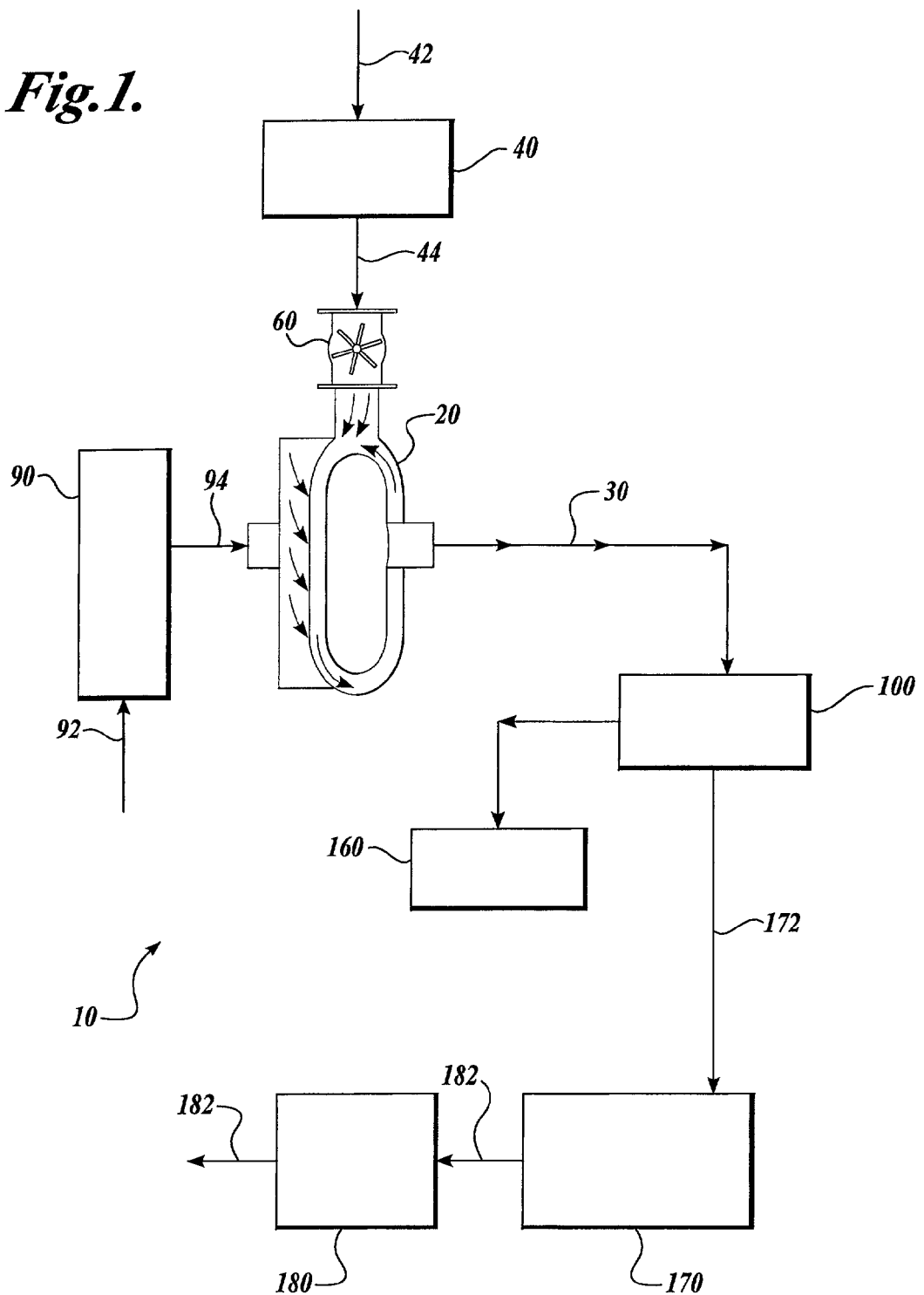
FIG. 1 is a schematic diagram of a drying system constructed in accordance with the present invention suitable for carrying out the process in the present invention.

The present invention comprises a drying system having a jet drier designed to dry wet pulp directly from a pulp mill to a singulated fiber product. Referring to FIG. 1, a drying system 10 constructed in accordance with the present invention includes a jet drier 20, a pulp supply station 40, an air supply station 90, a fiber separation station 100, and a fiber collection station 160.

The pulp supply station 40 is coupled in flow communication with the jet drier 20. The pulp supply station 40 receives supply pulp from a pulp supply source 42 and provides a feed pulp to the jet drier 20 via a pulp feed conduit 44. The air supply station 90 is coupled in flow communication with the jet drier 20. The air supply station 90 receives supply air from an air supply source 92 and provides feed air via an air feed conduit 94 to the jet drier 20. The jet drier 20 is coupled in flow communication with the fiber separation station 100 via outlet flow conduit 30. The jet drier 20 exhausts outlet air, substantially dried and singulated fibers, and fines to the fiber separation station 100 via outlet flow conduit 30. The fiber separation station 100 is coupled in flow communication with the fiber collection station 160. The fiber separation station 100 separates the outlet air from the fibers, and may also separate a portion of the fines from the fibers. The fibers from the fiber separation station 100 are delivered to the fiber collection station 160.

In a preferred embodiment, the apparatus also includes a fines removal station 170 and a noise reduction station 180. The fiber separation station 100 is coupled in flow communication with the fines removal station 170 through fines conduit 172. The fiber separation station 100 provides outlet air and fines to the fines removal station 170 via fines conduit 172. The fines removal station 170 removes the fines from the outlet air and recycles the outlet air back to the air supply station 90 via air conduit 182. The noise reduction station 180 is preferably interposed in air conduit 182 to reduce the noise produced by the drying system 10.

Figure 2:
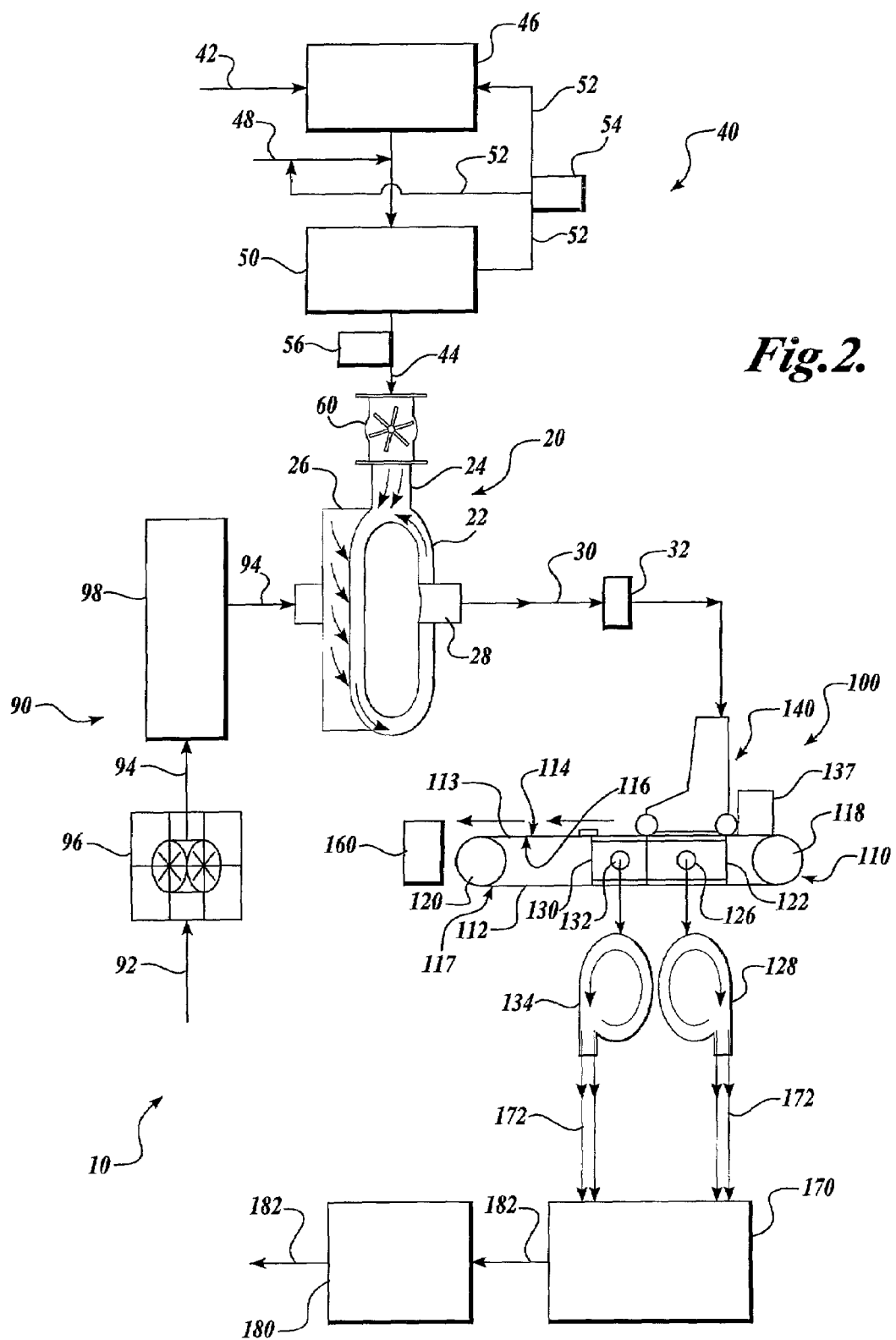
FIG. 2 is a schematic view of the drying system of the present invention with a cross section view of a jet drier and a fiber separation station.

Referring to FIG. 2, the jet drier 20 includes a loop conduit 22, a pulp intake 24, a manifold 26, and a fiber outlet 28. It will be understood that, as used herein, the term "jet drier" means any device which accelerates air into the loop conduit 22, enabling the simultaneous drying and singulation of a substance flowing though the conduit 22. The pulp intake 24 is coupled to the conduit 22 for delivering feed pulp to the conduit 22. The manifold 26 is coupled to the jet drier conduit 22 to deliver feed air via air feed conduit 94 into the conduit 22 through a series of nozzles which are directed to induce a flow within the conduit 22. The fiber outlet 28 is coupled to the conduit 22 to supply an outlet for outlet air, fibers, and fines flow out of conduit 22.

The conduit 22 is preferably arranged in a closed loop. The conduit 22 loop can take various shapes such as circular, elongated rectangular, a "D" shape, square, or other similar shape. Without being bound by theory, it is believed that when wet fibers enter the conduit 22 loop, a centrifugal separation takes place so that wetter/denser fibers are recirculated along the outer edge of the loop while drier/less-dense fibers move towards the inner part of the loop. Air and dried product exit from a fiber outlet 28 placed along the inner part of the loop. One suitable jet drier 20 for use in the present invention is a Fluid Energy Aljet Model 4 Thermajet, X0870L, manufactured by Fluid Energy Processing & Equipment Company. Alternatively, the jet drier conduit 22 may be in a shape other than a closed loop. For example, the conduit 22 could be straight. In this embodiment, the fibers may be recovered at the end of the conduit 22.

The drying system 20 further includes an outlet flow conduit 30 coupled to the jet drier 20 fiber outlet 28 and associated with the fiber separating station 100. The outlet flow conduit 30 delivers outlet air, fibers, and fines flow to the fiber separating station 100. The outlet flow conduit may include a first material handling fan 32. The first material handling fan 32 prevents the fibers and fines from settling out of the outlet air if the outlet air slows in the conduit 30. However, the first material handling fan 32 may not be necessary if the velocity of the outlet air maintains the fibers in suspension. The diameter of the outlet flow conduit will affect the velocity of the outlet air. It is desirable to prevent the fibers from settling out of the outlet air. If fibers settle out of the outlet air, the fibers have an increased tendency to knot or interlock.

The pulp supply station 40 may include a first dewatering device 46. The first dewatering device 46 is connected in flow communication with pulp supply 42 and pulp feed conduit 44. The pulp supply source 42 delivers supply pulp directly from the fiberline of a pulp mill to the first dewatering device 46. The first dewatering device 46 partially dewaters the supply pulp from pulp supply 42 and delivers feed pulp via pulp feed conduit 44 to jet drier 20. The first dewatering device 46 includes, but is not limited to, devices such as a screw press, belt press, continuous centrifuge, batch centrifuge, double roll press, or other similar device.

The supply pulp from pulp supply source 42 will typically have a high fluid content, having a 0.01–10% consistency, and more typically a 3–10% consistency, although consistencies up to 12% to 15% may be employed. The supply pulp may be bleached pulp, unbleached pulp, mechanical pulp, chemical pulp, a dissolving grade pulp, once dried and reslurried pulp, or any other suitable pulp. In the present invention, much of this fluid may be removed by the first dewatering device 46. Typically, the first dewatering device 46 removes a portion of the fluid from the supply pulp and increases the consistency of the feed pulp to 10–55%, prior to drying the feed pulp by the jet drier 20. Preferably the consistency of the feed pulp is 30 to 50%. The partially dewatered feed pulp is transported to the jet drier 20 via pulp feed conduit 44.

The supply pulp may be a pressed wet web of pulp having a basis weight of a substantial amount to provide sufficient stiffness to feed the web into a shredding device. The basis weight may typically be from 500 to 1500 gsm. The wet web supply pulp may be fed into a shredding device such as a rapidly rotating set of rolls containing protruding pins that tear the web into small pieces of pulp, a material handling fan, or other similar device.

The pulp feed conduit 44 may be a pipe, hopper, or other conveyance device. Additionally, the first dewatering device 46 itself may serve as a conveyance device. For example, the first dewatering device 46 may be a screw press which could be used to simultaneously dewater and transport the feed pulp to the jet drier 20. One suitable pulp supply station 40 pulp feed conduit 44 for use in the present invention is a shaftless screw conveyor designed and manufactured by Martin Sprocket and Gear, Inc., Martin Conveyor Division. The shaftless screw conveyor has a shaftless screw which feeds wet pulp at an incline that rises up toward the pulp intake 24 of the jet drier 20. The shaftless screw conveyor has a hopper at the lower end of the conveyor for placing supply pulp.

The pulp supply station 40 may include a treatment supply source 48 for incorporating a treatment substance into the feed pulp. The treatment supply source 48 may be coupled in flow communication to the pulp supply source 42, the pulp feed conduit 44, the first dewatering station 46, or anywhere along the pulp supply station 40.

The treatment supply source 48 may deliver the treatment substance with any apparatus known in the art. For instance, treatment supply source 48 may deliver the treatment substance with a conduit, spray system, mixing device, or other device or combination of devices. Where the supply pulp is a pressed wet web of pulp, the treatment substance may be applied to the supply pulp by a spray system, roller coating system, or a combination of spray system and roller coating system.

Many treatment substances that may be applied to the feed pulp prior to being dried and singulated by the jet drier 20, are incapable of being incorporated into the traditional process of producing dried singulated fibers. The traditional process is limited in its ability to treat the fibers since they are in a web form. In this web form, treatment of the fibers must be done by running the web through a bath or spraying the web. The present invention is not limited in this way, since treatment substances may be directly delivered to the pulp. For example, the fibers of the supply pulp in the present invention may be suspended within a foam prior to drying by the jet drier 20 or viscous solutions may be mixed with the supply pulp. Neither one of these treatment choices would be practical with the traditional bath treatment step. The application of treatment substances that are viscous solutions cannot be accomplished with a traditional pulp machine. Additionally, the harsh conditions of hammermilling limit the practicality of the fibers retaining certain compounds that may be used as treatment substances. For example, coating the fibers with mineral particulate, such as clay, would result in low clay retention with hammermilling, but in the present invention retention may be significantly higher due to the singulation being accomplished by air rather than mechanical means. Further, the amount of surfactant used to treat pulp on a traditional pulp machine is limited due to the adverse affect on operations, however, there is no such limitation with the present invention. In traditional pulp machines, the surfactant decreases the strength of the pulp web. If enough strength is lost, the pulp web will break under normal tension encountered on a traditional pulp machine.

The treatment substance delivered by treatment supply source 48 may include, but is not limited to, surfactants, crosslinkers, hydrophobic materials, mineral particulates, superplasticizer, water reducing agents, foams, other materials for specific end-use fiber properties, and combinations of treatment substances. The term surfactant includes, but is not limited to oil in water emulsions; surfactants disclosed in U.S. application Ser. No. 08/509,401 to Graef et al.; U.S. Pat. No. 3,554,863 to Hervey et al.; U.S. Pat. No. 6,074,524 to Wu et al.; U.S. Pat. No. 6,159,335 to Owens et al.; and Canadian Pat. No. 947915 to Angel et al.; all of which are expressly incorporated herein by reference. Surfactants impart desirable properties to pulp fibers such as reducing fiber to fiber bonding, improving absorbency or reducing friction of finished webs. Surfactants are used in tissue and towel manufacturing, and are used extensively in the textile industry for numerous enhancements. The classes of surfactants include anionic, cationic, nonionic, or ampholytic/zwitterionic surface active materials. Examples of anionic surfactants include sodium stearate, sodium oleate, sodium dodecyl sulfate, sodium dodecyl benzene sulfonate, polyether sulfate, phosphate, polyether ester and sulfosuccinate. Examples of cationic surfactants include dodecylamine hydrochloride, hexadecyltrimethyl ammonium bromide, cetyltrimethyl-ammonium bromide, and cetylpyridinium bromide. One class of surfactant is cationic surfactants based on quaternary ammonium compounds containing fatty type groups. Examples of non-ionic surfactants include polyethylene oxides, sorbitan esters, polyoxyethylene sorbitan esters, and alkylaryl polyether alcohols. An example of ampholytic or zwitterionic surfactant is dodecyl betaine. Examples of commercial surfactant are EKA Chemicals Inc. Berolcell 587K which is a cationic surface active agent and Process Chemicals, LLC Softener CWW which is a cationic surfactant used as a yarn lubricant.

The term crosslinker includes, but is not limited to, any one of a number of crosslinking agents and crosslinking catalysts. The following is a representative list of useful crosslinking agents and catalysts. Each of the patents noted below is expressly incorporated herein by reference in its entirety.

Suitable urea-based crosslinking agents include substituted ureas such as methylolated ureas, methylolated cyclic ureas, methylolated lower alkyl cyclic ureas, methylolated dihydroxy cyclic ureas, dihydroxy cyclic ureas, and lower alkyl substituted cyclic ureas. Specific urea-based crosslinking agents include dimethyldihydroxy urea (DMDHU, 1,3-dimethyl-4,5-dihydroxy-2-imidazolidinone), dimethyloldihydroxyethylene urea (DMDHEU, 1,3-dihydroxymethyl-4,5-dihydroxy-2-imidazolidinone), dimethylol urea (DMU, bis[N-hydroxymethyl]urea), dihydroxyethylene urea (DHEU, 4,5-dihydroxy-2-imidazolidinone), dimethylolethylene urea (DMEU, 1,3-dihydroxymethyl-2-imidazolidinone), and dimethyldihydroxyethylene urea (DDI, 4,5-dihydroxy-1,3-dimethyl-2-imidazolidinone).

Suitable crosslinking agents include dialdehydes such as $C_2-C_8$ dialdehydes (e.g., glyoxal), $C_2-C_8$ dialdehyde acid analogs having at least one aldehyde group, and oligomers of these aldehyde and dialdehyde acid analogs, as described in U.S. Pat. Nos. 4,822,453; 4,888,093; 4,889,595; 4,889,596; 4,889,597; and 4,898,642. Other suitable dialdehyde crosslinking agents include those described in U.S. Pat. Nos. 4,853,086; 4,900,324; and 5,843,061.

Other suitable crosslinking agents include aldehyde and urea-based formaldehyde addition products. See, for example, U.S. Pat. Nos. 3,224,926; 3,241,533; 3,932,209; 4,035,147; 3,756,913; 4,689,118; 4,822,453; 3,440,135; 4,935,022; 3,819,470; and 3,658,613.

Suitable crosslinking agents include glyoxal adducts of ureas, for example, U.S. Pat. No. 4,968,774, and glyoxal/cyclic urea adducts as described in U.S. Pat. Nos. 4,285,690; 4,332,586; 4,396,391; 4,455,416; and 4,505,712.

Other suitable crosslinking agents include carboxylic acid crosslinking agents such as polycarboxylic acids. Polycarboxylic acid crosslinking agents (e.g., citric acid, propane tricarboxylic acid, and butane tetracarboxylic acid) and catalysts are described in U.S. Pat. Nos. 3,526,048; 4,820,307; 4,936,865; 4,975,209; and 5,221,285. The use of $C_2-C_9$ polycarboxylic acids that contain at least three carboxyl groups (e.g., citric acid and oxydisuccinic acid) as crosslinking agents is described in U.S. Pat. Nos. 5,137,537; 5,183,707; 5,190,563; 5,562,740, and 5,873,979.

Polymeric polycarboxylic acids are also suitable crosslinking agents. Suitable polymeric polycarboxylic acid crosslinking agents are described in U.S. Pat. Nos. 4,391,878; 4,420,368; 4,431,481; 5,049,235; 5,160,789; 5,442,899; 5,698,074; 5,496,476; 5,496,477; 5,728,771; 5,705,475; and 5,981,739. Polyacrylic acid and related copolymers as crosslinking agents are described U.S. Pat. Nos. 5,549,791 and 5,998,511. Polymaleic acid crosslinking agents are described in U.S. Pat. No. 5,998,511.

Specific suitable polycarboxylic acid crosslinking agents include citric acid, tartaric acid, malic acid, succinic acid, glutaric acid, citraconic acid, itaconic acid, tartrate monosuccinic acid, maleic acid, polyacrylic acid, polymethacrylic acid, polymaleic acid, polymethylvinylether-co-maleate copolymer, polymethylvinylether-co-itaconate copolymer, copolymers of acrylic acid, and copolymers of maleic acid.

Other suitable crosslinking agents are described in U.S. Pat. Nos. 5,225,047; 5,366,591; 5,556,976; 5,536,369, 6,300,259, and U.S. application Ser. No. 08/509,401 to Graef et al.

Suitable catalysts can include acidic salts, such as ammonium chloride, ammonium sulfate, aluminum chloride, magnesium chloride, magnesium nitrate, and alkali metal salts of phosphorous-containing acids. In one embodiment, the crosslinking catalyst is sodium hypophosphite. Mixtures or blends of crosslinking agents and catalysts can also be used.

The crosslinking agent is applied to the cellulosic fibers in an amount sufficient to effect intrafiber crosslinking. The amount preferably applied to the cellulosic fibers can be from about 0.1 to about 10 percent by weight based on the total weight of fibers. Higher concentrations can be employed but may not be practical in a production environment. In one embodiment, crosslinking agent is applied in an amount from about 4 to about 6 percent by weight based on the total weight of fibers.

The term hydrophobic material includes, but is not limited to, latex, sizing agents used to treat pulp such as alkyl ketene dimer or alkenyl succinic anhydride, rosins and synthetic rosins, waxes, oils, or other chemicals that react with the fiber and render the surface hydrophobic. The term mineral particulate includes, but is not limited to, clay, calcined clay, calcium carbonate, calcium sulfate, zinc oxide, talc, titanium dioxide, silicas, fly ash, sodium aluminosilicates, or other minerals. The term superplasticizer includes, but is not limited to, polymers that contain sulfonic acid groups, modified lignosulfonates, sulfonated melamine-formaldehyde condensates, sulfonated naphthalene-formaldehyde condensates, and polycarboxylate derivatives. An example of a commercial superplasticizers include Boral Materials Technology Boral SP, a sulfonated naphthalene-formaldehyde condensate. The term foam includes, but is not limited to, foaming agents, foamed material, and foams disclosed in U.S. application Ser. No. 09/569,380 to Graef et al., which are expressly incorporated herein by reference. The term water reducing agent includes, but is not limited to, water soluble adhesives and plasticizers. An example of a commercial water reducing agent is methyl cellulose.

The treatment supply source 48 may also deliver more than one treatment substance, and may deliver treatment substances in any number of steps or stages. For instance, the treatment substance may include binder molecules and particles, where the binder molecules are first applied to the fibers and then the particles are added to the binder molecule coated fibers thus binding the particles to the fibers (as disclosed in U.S. Pat. No. 5,641,561 to Hansen et al., which is expressly incorporated herein by reference). Other fiber treatment substances and methods known in the art may be used without departing from the present invention.

In addition to the embodiment described above, the pulp supply station 40 may be adapted so that the water contained in the pulp supply source 42 is exchanged for a solvent treatment substance. The term solvent includes, but is not limited to, alcohols, ketones, ethers, alkanes, aromatics, aldehydes, or other classes of organic materials. The solvent used may be recovered at the fiber separation station 100

Additional treatment substances may be added to cause an in situ precipitation. When in situ precipitation is desirable, a first mineral treatment substance is added to the pulp, then a second treatment substance is added to the pulp. The first and second treatment substances react to form a precipitate treatment substance. For example, dissolved calcium hydroxide may be used as the first treatment substance and dissolved sodium bicarbonate may be used as the second treatment substance. The calcium hydroxide and sodium bicarbonate react to precipitate calcium carbonate. Other precipitate treatment substances may be formed for treating the pulp including, but is not limited to, calcium aluminum silicates, calcium aluminum carbonates, calcium aluminum phosphates, or other mineral precipitates.

The pulp supply station 40 may include a second dewatering device 50. The second dewatering device 50 is inserted in pulp feed conduit 44 to be in flow communication with the first dewatering device 46. The second dewatering device 50 may include, but is not limited to, devices such as a screw press, belt press, continuous centrifuge, batch centrifuge, double roll press, or other similar device. Like the first dewatering device 46, the second dewatering device 50 removes a portion of the fluid so the feed pulp has a consistency of 10–55%, preferably 30–50%, prior to drying the feed pulp by the jet drier 20. The partially dewatered feed pulp is then transported to the jet drier 20 by pulp feed conduit 44. Alternatively, the second dewatering device 50 itself may serve as a conveyance device. For example, a screw press could be used to simultaneously dewater and transport the feed pulp to the jet drier 20.

The second dewatering device 50 further dewaters the treated feed pulp, potentially removing a portion of the treatment substance from the pulp. To recover a portion of the separated treatment substance, a treatment recycle conduit 52 may be connected in flow communication between the second dewatering device 50 first dewatering device 46 and/or the treatment supply source 48. The incorporation of treatment substance with the pulp may be accomplished through the agitation supplied by the first and/or second dewatering devices 46 and 50.

Alternatively, the pulp supply station 40 may include a holding tank device 54. The holding tank device 54 may be inserted in recycle conduit 52 to be in flow communication with the second dewatering device 50. The holding tank device 54 acts as a reservoir to store separated treatment substance from the second dewatering device 50 and disperse the stored separated treatment substance to the first dewatering device 46 and/or to the treatment supply source 48.

The pulp supply station 40 may include a second material handling fan 56 inserted in flow communication into pulp feed conduit 44. After dewatering, the feed pulp may be run through the second material handling fan 56 to break apart the larger pieces of feed pulp into substantially uniform pieces, prior to introduction into the jet drier 20. The second material handling fan 56 may be any de-flaking device, including but not limited to, a buster fan, a pin fluffer, a material handling fan, or a shredder.

The pulp supply station 40 further includes a pulp feed device 60 coupled in flow communication with pulp feed conduit 44 and jet drier 20 pulp intake 24. The pulp feed device 60 is a wet pulp delivery apparatus that can produce a regulated continuously consistent supply of feed pulp at a desired feed rate to the pulp intake 24 of the jet drier 20. The feed pulp has been previously dewatered and in some cases treated. The feed rate of feed pulp is a process variable that has a direct affect on process air temperature, process air pressure, end product fiber appearance, and end product fiber knot count. The pulp feed device 60 is a device that separates atmospheric air from an environment of a higher or lower pressure inside the jet drier 20, and/or separates ambient temperatures from an environment of higher temperatures inside the jet drier 20. The pulp feed device 60 allows a continuous input of feed pulp to pass through to the jet drier 20 with a minimum flow of atmospheric air entering the jet drier 20. It is an air-lock positive displacement device.

Figure 3:
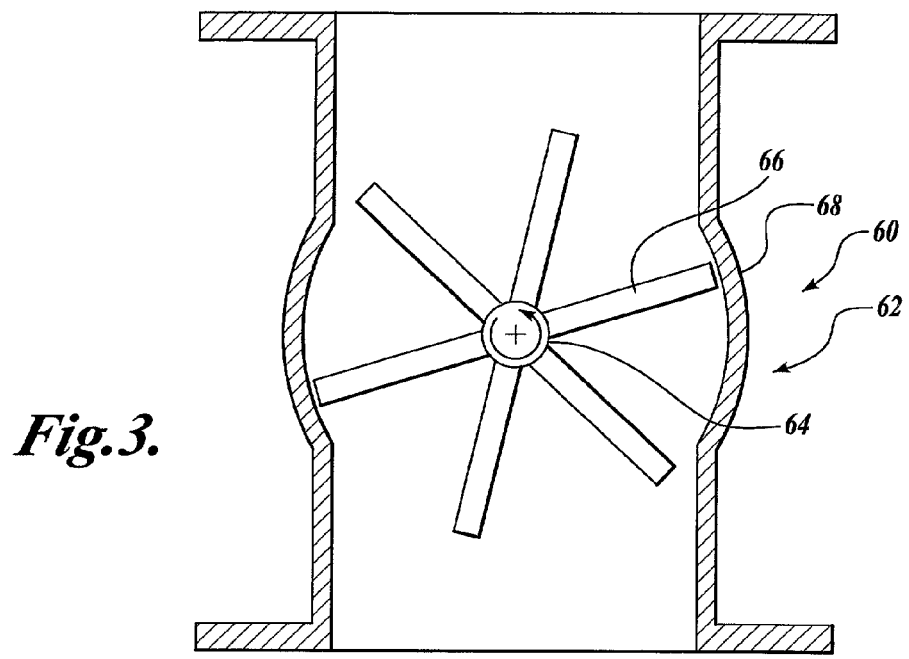
FIG. 3 is a cross section view of a pulp feed device of the present invention.
Figure 4:
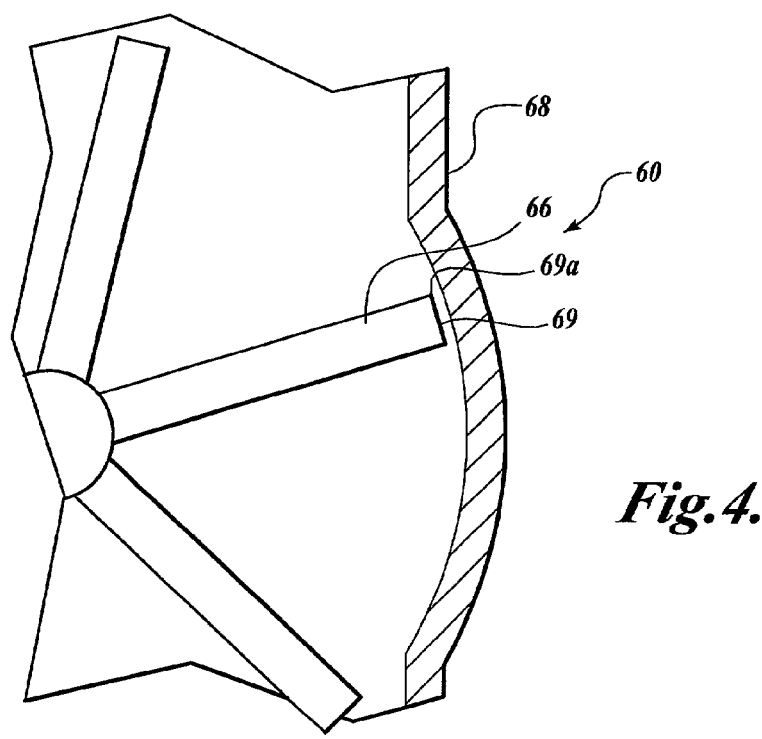
FIG. 4 is an enlarged cross section view of the pulp feed device rotor of the present invention.

Referring to FIG. 3, the pulp feed device 60 may be a rotary air lock 62 having a rotor 64 with rotor vanes 66 rotatably mounted within a rotor housing 68. One suitable rotary air lock 62 for use in the present invention is a modified stainless steel Prater Industries Rotary Air Lock Feeder model number PAV-6C having a rotor housing, and a CLSD,SS,PAV-6 rotor with six rotor vanes. Referring to FIG. 4, the Prater Industries rotor vanes were supplied from the manufacturer with an end 69 that had standard clearance between the end of each vane and the rotor housing 68 of less than 0.010 inches. This standard clearance causes the feed pulp to jam between the rotor vanes 66 and the housing 68. Therefore the Rotary Air Lock Feeder was modified to provide a leading edge 69A that would shear the pulp, and an end profile that would prevent the pulp between the end 69 and the housing 68 from rolling into intertwined bundles. The profile of end 69 can be either flat or beveled rearwardly and radially inwardly. This modification allows the feed pulp to run through the pulp feed device 60 without damaging fibers or jamming the pulp feed device 60 and minimizing air leakage. It was found that a 0.030 inch clearance between the leading edge of each vane 66 and the rotor housing 68 and a 0.050 inch clearance at the radial centerline of each vane 66 minimized jamming, rolling or air leakage around the rotor 64. A clearance between the rotor and the housing from 0.010 to 0.050 inches should be effective for minimizing rotor jamming, rolling and air leakage around the rotor 64.

Figure 5:
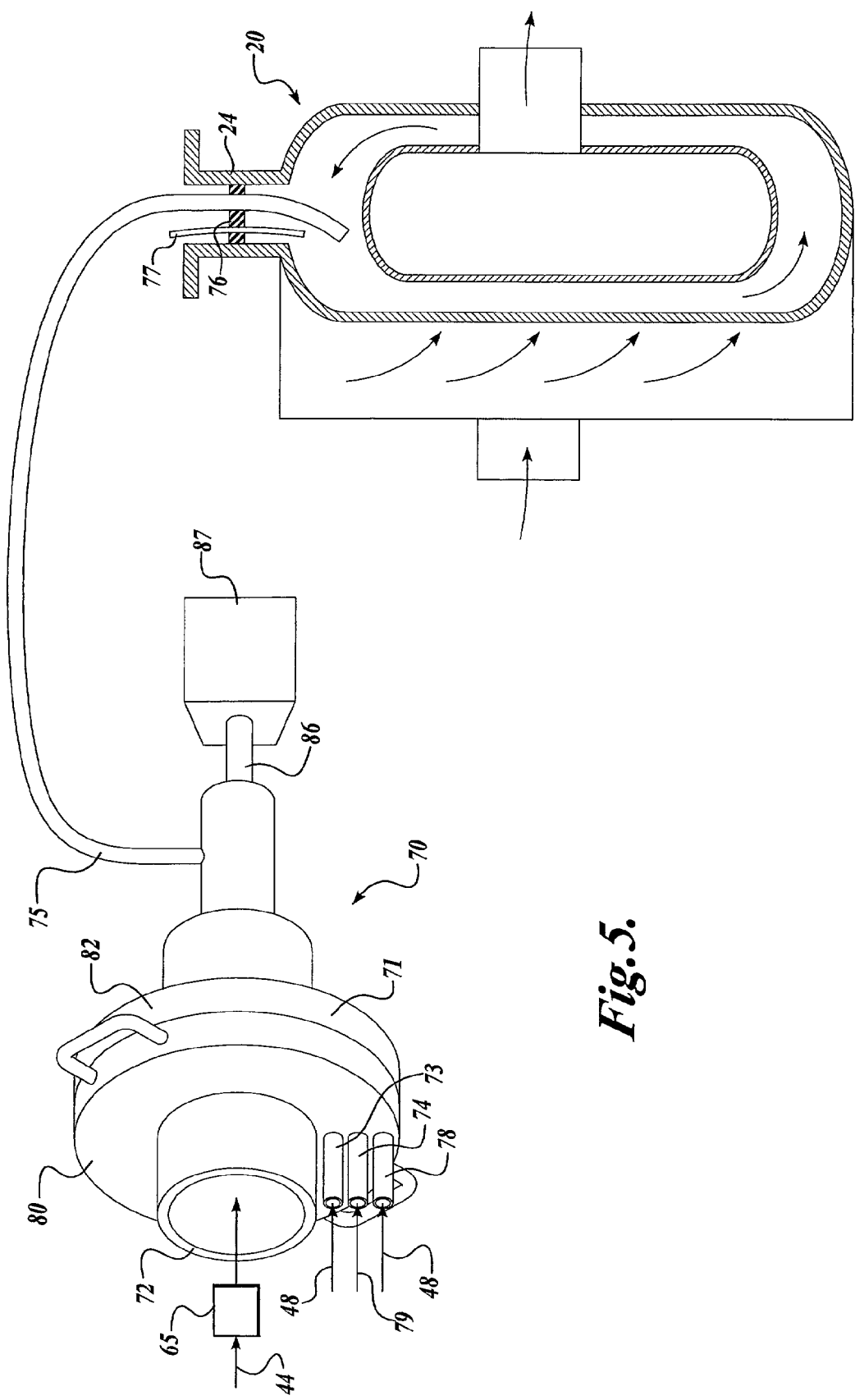
FIG. 5 is a side view of a mechanical mixer and the jet drier of the drying system of the present invention.
Figure 6:
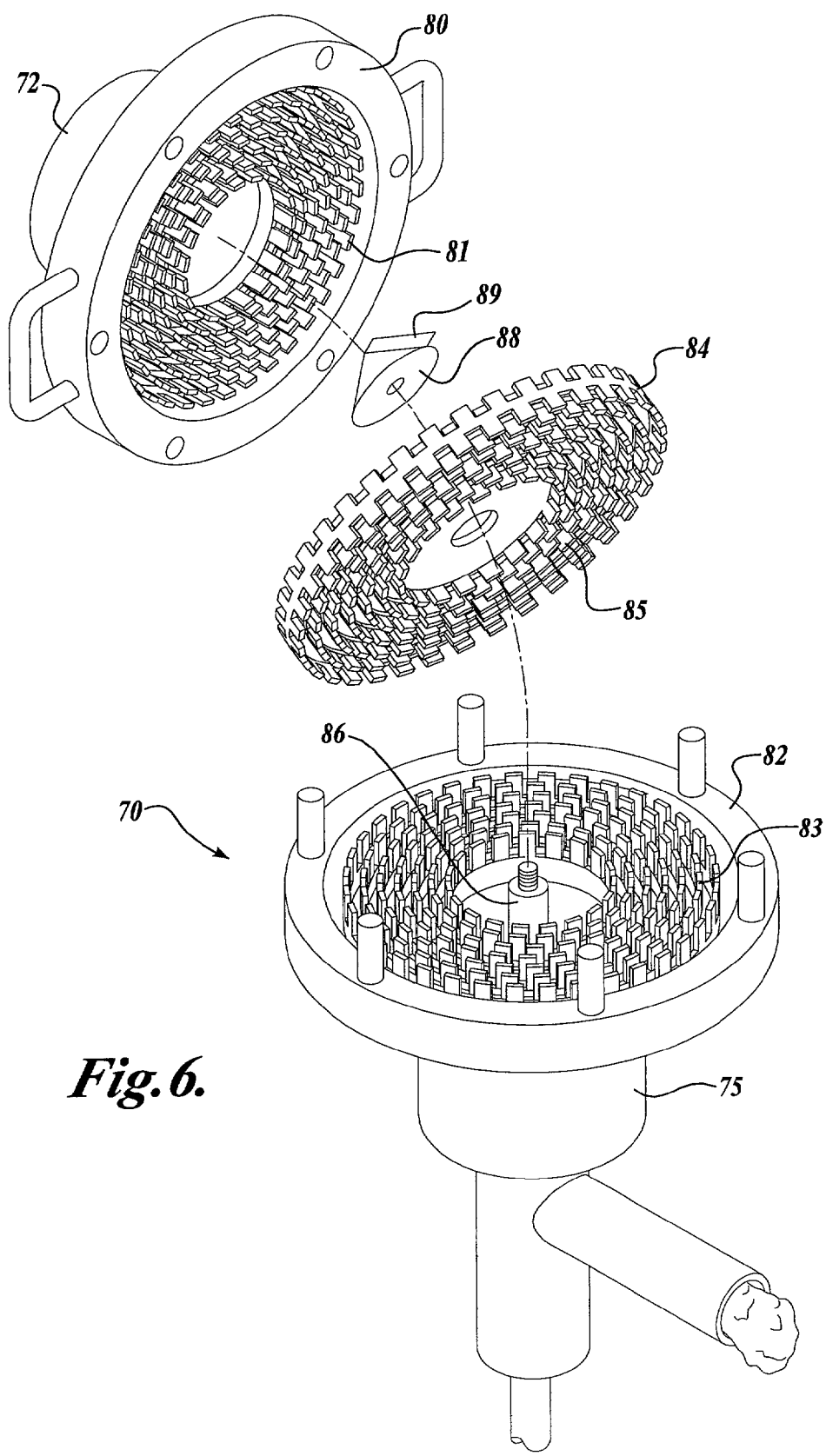
FIG. 6 is an exploded view of the mechanical mixer of the present invention.

Referring to FIGS. 2, 5, and 6, a foam feeder 70 may be used in place of the pulp feed device 60. The foam feeder 70 produces a regulated continuously consistent supply of foamed feed pulp at a desired feed rate to the pulp intake 24 of the jet drier 20. The foam feeder 70 mixes a surfactant and air with pulp and directly injects a foamed pulp mixture into the jet drier 20. The foam feeder 70 is a mechanical mixer that takes pulp feed, adds a surfactant treatment substance and air to the pulp, and mechanically agitates the surfactant to suspend the pulp fibers in a foam medium. The foam feeder 70 includes a mechanical mixer main body 71, a pulp injection port 72, a surfactant injection port 73, an air injection port 74, and a foam outlet conduit 75. The mechanical mixer main body 71 may be any suitable mechanical mixer known in the art. The pulp injection port 72 is in flow communication between the pulp feed conduit 44 and the mechanical mixer main body 71. The pulp injection port 72 supplies pulp feed to the mechanical mixer main body 71. The surfactant injection port 73 is in flow communication between the treatment supply source 48 and the mechanical mixer main body 71, and is placed in close proximity with the pulp injection port 72. The surfactant injection port 73 supplies surfactant treatment substance to the mechanical mixer main body 71. The air injection port 74 is in flow communication between a pressurized air source 79 and the mechanical mixer main body 71, and is placed in close proximity with the surfactant injection port 73. The air injection port 74 supplies supply air to the mechanical mixer main body 71. The foam outlet conduit 75 is in flow communication between the mechanical mixer main body 71 and the jet drier 20 pulp intake 24. The foam outlet conduit 75 discharges the pulp fibers suspended in foam from the mechanical mixer main body 71 and delivers them to the jet drier 20 pulp intake 24. To optimize the flow of the pulp fibers suspended in foam from foam outlet conduit 75, the foam outlet conduit 75 diameter, conduit shape, outlet shape, length inserted into the jet drier 20, and/or angle of insertion into the jet drier 20 may be adjusted. The foam feeder 70 may be a screw pump, or any other suitable device known in the art.

Alternatively, a pulp feed device 65 may feed pulp to the foam feeder 70 pulp injection port 72. The pulp feed device 65 may be used where the foam feeder 70 cannot itself produce a regulated continuously consistent supply of feed pulp to the jet drier 20. The pulp feed device 65 may be a positive displacement pump, or any other suitable device known in the art.

The foam outlet conduit 75 may be sealed to the jet drier 20 pulp intake 24 by a pulp intake seal 76. The pulp intake seal 76 may be supplied with an air leak conduit 77 connected to the pulp intake seal 76 and running from the jet conduit 22 to ambient air. The air leak conduit 77 provides a limited path between the jet conduit 22 and ambient air. The conduit may be supplied with a conventional air valve for adjusting the leakage amount. Without being bound in theory, it is believed that the air leak conduit 77 provides a limited pressure relief to the jet conduit 22 and prevents unstable operating conditions within the jet conduit 22.

Optionally, the foam feeder 70 includes a treatment injection port 78 in flow communication between the treatment supply source 48 and the mechanical mixer main body 71. The treatment injection port 78 may supply an additional treatment substance to the mechanical mixer main body 71. The treatment injection port 78 may be located any where along the mechanical mixer main body 71.

Referring to FIG. 6, one suitable foam feeder 70 for use in the present invention is a redesigned and modified mechanical mixer from E. T. Oakes Corporation (Oakes Mixer) for generating a foam suspension of pulp that can be fed into the jet drier. The foam feeder 70 includes a front stator 80, a rear stator 82, a foaming rotor 84, and a drive shaft 86 driven by a motor 87 (shown in FIG. 5). The front stator 80 is connected about the pulp injection port 72 and defines a circular plane about the pulp injection port 72. The front stator 80 has multiple circular rows of teeth 81 extending perpendicularly from the circular plane of front stator 80. These multiple circular rows of teeth 81 are spaced apart, the spaces forming channels between the rows of teeth 81. The rear stator 82 is connected about the foam outlet conduit 75 and defines a circular plane about the foam outlet conduit 75. The rear stator 82 has multiple circular rows of teeth 83 extending perpendicularly from the circular plane of rear stator 82. These multiple circular rows of teeth 83 are spaced apart, the spaces forming channels between the rows of teeth 83. The foaming rotor 84 defines a circular plane and has multiple circular rows of teeth 85 extending perpendicularly from both sides of the foaming rotor 84. One set of the foaming rotor 84 circular rows of teeth 85 fit within the channels formed by the front stator 80 circular rows of teeth 81. Likewise the other set of the foaming rotor 84 circular rows of teeth 85 fit within the channels formed by the rear stator 82 rows of teeth 83. This allows the foaming rotor 84 to be rotatably associated with both the front and rear stators 80 and 82. The front and rear stators 80 and 82 are connected together about foaming rotor 84, and the foaming rotor 84 is rotatably associated with both the front and rear stators 80 and 82. The drive shaft 86 is connected to the center of the foaming rotor 84 and runs from the foaming rotor 84, through the foam conduit 75, and to motor 87 (shown in FIG. 5).

Referring now to both FIGS. 5 and 6, As pulp feed is forced from the pulp injection port 72 into front stator 80, the pulp feed contacts the stationary teeth 81 of front stator 80 and the rotating teeth 85 of foaming rotor 84. The pulp is forced out from the pulp injection port 72 along the surface of the front stator 80, around the rotating foaming rotor 84, along the surface of the rear stator 82, and out the foam outlet conduit 75. While the pulp is in contact with the front stator 80, the surfactant treatment substance is forced from the surfactant injection port 73 into contact with the pulp feed front stator teeth 81 and the foaming rotor teeth 85. The supply air is also forced from the air injection port 74 into contact with the pulp feed, front stator teeth 81, and the foaming rotor teeth 85. The foaming rotor 84 mixes the pulp feed, surfactant and air together. The mechanical agitation of the foaming rotor 84 causes the pulp feed fibers to be suspended in a foam. The foamed pulp feed may then be fed directly into the jet drier 20 via the foam outlet conduit 75. The consistency of the foamed feed pulp may be 30% or less.

Referring to FIG. 6, optionally, drive shaft 86 is connected to the center of the foaming rotor 84 by an auger head 88. The auger head 88 has a generally conical shape, and may have a protrusion 89 from the face of the conical surface of auger head 88. The auger head 88 serves to force the pulp feed from pulp injection port 72 toward the rotating teeth 85 of foaming rotor 84. The protrusion 89 serves to break up the pulp feed and enhance mixing of the pulp feed with the surfactant treatment substance.

The Oakes mixer was modified by placing the foam outlet conduit 75 at the original inlet of the Oakes mixer. Without being bound in theory, it has been found that superior mixing is achieved when the pulp injection port 72 has a greater diameter than foam outlet conduit 75. The original outlet of the Oakes mixer was enlarged to increase flow of feed pulp into pulp injection port 72, and to place the feed pulp in contact with the teeth 85 of rotor 84. The Oakes mixer, originally came equipped with a nut for connecting the drive shaft 86 to the center of the foaming rotor 84; and this was replaced by the auger head 88 above. Additionally, several rows of teeth (81, 83, and 85) were removed from the Oakes mixer to improve mixing and increase throughput.

Referring again to FIG. 2, the air supply station 90 may include an air pump 96 and an air heater 98. The air pump 96 receives supply air via the air supply source 92 and is coupled in flow communication with air feed conduit 94. The air heater 98 is inserted into air feed conduit 94 and in flow communication with air pump 96 and the jet drier 20 manifold 26 via air feed conduit 94.

The air pump 96 may be a positive displacement high volume air pump that delivers the supply air at a positive air pressure and at a fixed volume to the air heater 98. One suitable air pump 96 for use in the present invention is a Roots-Dresser universal rotary lobe blower system (model number 45 URAI) with inlet silencer type CCF-4 with a paper element, a discharge silencer type Universal SD-4, filtration and electric 15 hp drive motor. The flow rate may be 300 SCFM. The delivered pressure may be 5 PSIG. The pump speed may be 3176 RPM. The drive motor may run at 1800 RPM. The air pump 96 may have a gauge range of 0 to 15 psig and it may be fitted with a pressure relief valve set at 6 psig. The air heater 98 heats the supply air and delivers the feed air to the manifold 26 of the jet drier 20. The manifold 26 may feed the feed air tangentially into the jet drier 20 conduit 22 loop for the purpose of creating turbulence for fiberizing-and drying the feed pulp inside the jet drier 20.

The air heater 98 may be a flow through type heater that is controlled to regulate the air temperature supplied to the jet drier manifold 26 nozzles that feed the conduit 22. The air heater 98 may be an electric heater, a gas heater or any other form of heater. One suitable air heater 98 for use in the present invention is a Watlow Electric Immersion heater, model number 700-96BD2459 that uses 480 VAC line voltage, and has a pressure rating of 150 psig at 1,050° F. The air heater 98 over temperature protection uses a type K thermocouple and a Watlow series 92 controller. The air heater 98 process temperature regulator uses type J thermocouples and Watlow series 965 auto tuning controller. The process air temperature is a process variable that has a direct affect on end product fiber appearance, end product fiber knot count, and fines content.

Upon exiting the jet drier 20, the outlet air, fibers, and fines may be transported along the outlet flow conduit 30 to be recovered by the fiber separation station 100. The fiber separation station 100 may be a vacuum conveyor 110 slidably associated with outlet flow conduit 30 through a head box 140. The vacuum conveyor 110 includes a screen 112, a first roller 118, a second roller 120, a primary fan vacuum box 122, a primary fan 128, a secondary fan vacuum box 130, and a secondary fan 134.

The vacuum conveyor 110 screen 112 is a porous conveyor belt device which passes the outlet air and fines through the screen 112 while preventing the flow of fiber through the screen 112. The screen 112 is a continuous loop rotatably coupled to the first roller 118 and the second roller 120. The screen 112 thus provides a screen upper portion 113 having a screen upper surface 114 and a screen lower surface 116, and a screen lower portion 117. The outlet flow conduit 30 from the jet drier 20 is slidably associated with the vacuum conveyor 110 by the head box 140 so that the outlet flow conduit 30 is in flow communication with the upper surface 114 of the screen 112. The outlet flow conduit 30 delivers fibers, fines, and outlet air to the upper surface 114. The screen 112 passes the outlet air through the upper surface 114 while retaining fibers on the upper surface 114. A fraction of the fines may be passed through the screen 112. Alternatively, the screen 112 may collect the fines by trapping them in the fibers as the fibers are retained under the outlet flow conduit 30 on the moving conveyor screen 112. This trapping of fines may result in a level of fines and opacity that does not require subsequent fines removal at the fines removal station 170. The rotating screen 112 transports the fibers from the outlet flow conduit 30 toward the fiber collection station 160, defining an upstream to downstream flow of fibers.

Figure 7:
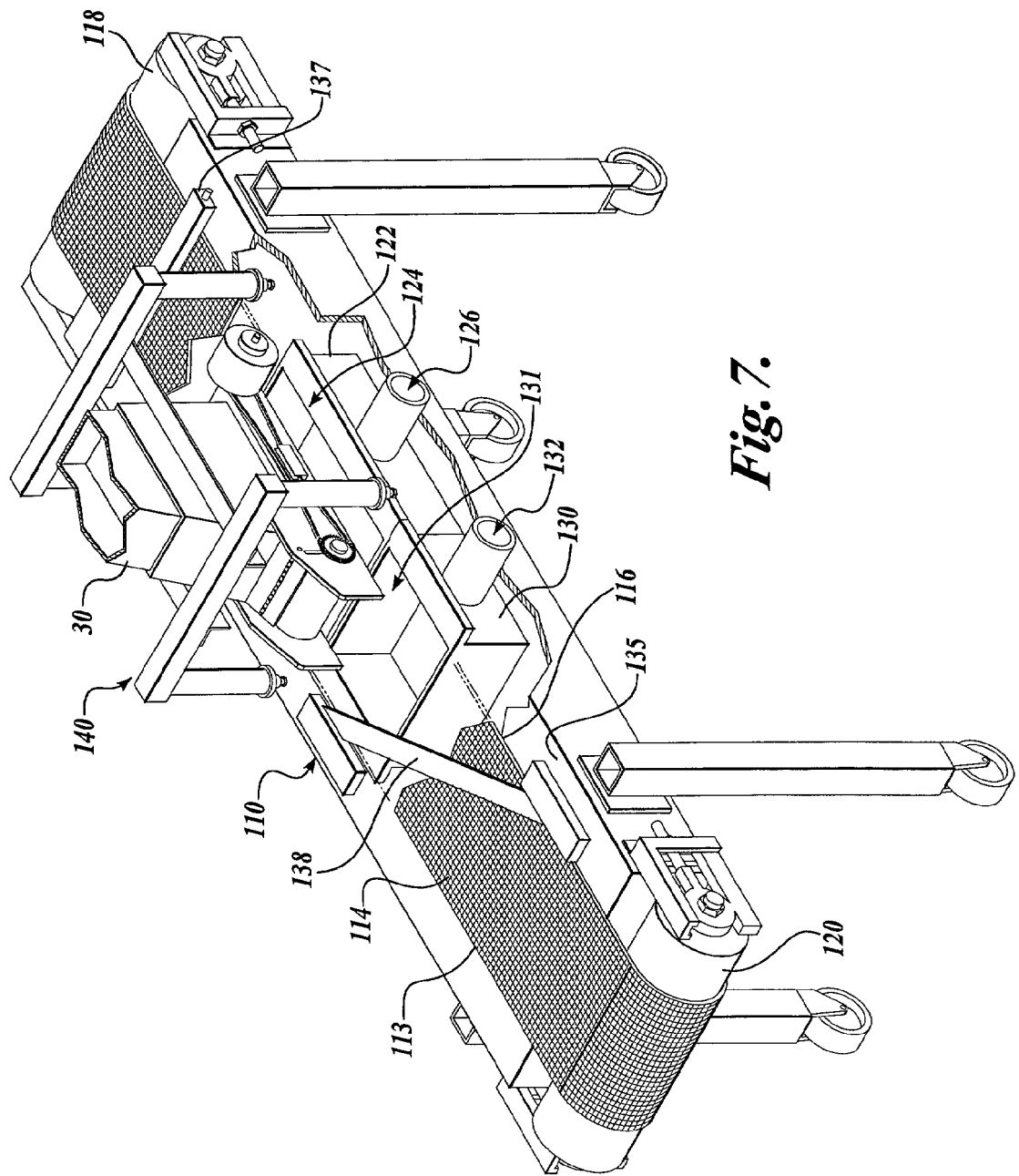
FIG. 7 is a perspective view of a fiber separation station of the present invention.
Figure 8:
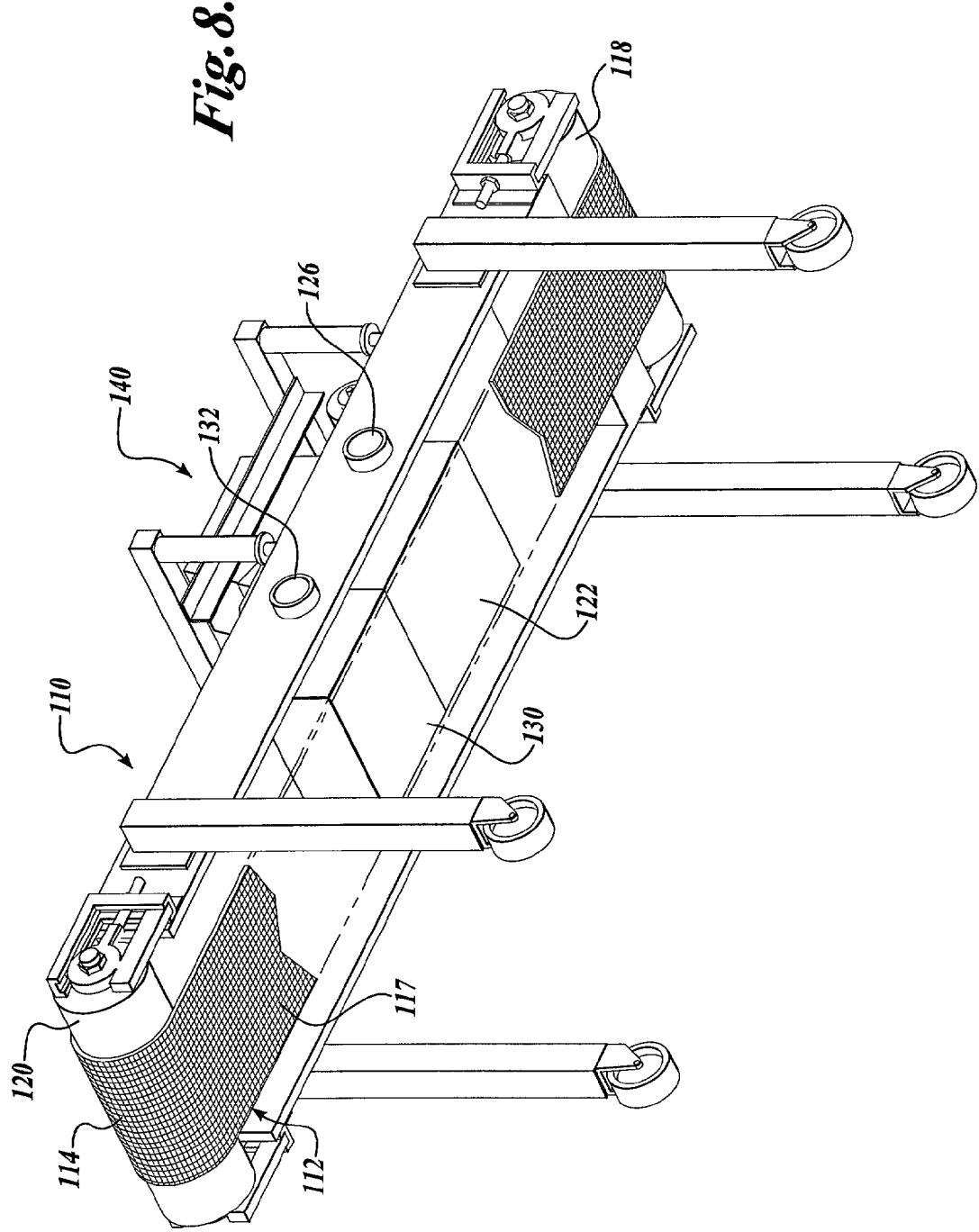
FIG. 8 is a bottom perspective view of the fiber separation station of the present invention.

Referring to FIGS. 7 and 8, the primary fan vacuum box 122 is a plenum that allows passage of outlet air and fines from the outlet flow conduit 30 through the screen to the primary fan 128. Referring to FIG. 7, the primary fan vacuum box 122 has an inlet 124 and an outlet 126. The primary fan vacuum box inlet 124 is positioned below the screen 112 upper portion 113 and slidably associated with the lower surface 116 of screen 112 directly under the head box 140, and is thus in flow communication with outlet flow conduit 30 through head box 140 and screen 112. The inlet to the primary fan vacuum box 122 is matched in size to the head box 140 to allow the head box 140 to seal against the primary fan vacuum box 122 conduit opening while allowing the screen 112 to freely pass therebetween without allowing tramp air to affect the vacuum generated by the primary fan 128.

Referring to FIG. 2, The vacuum conveyor 110 primary fan 128 is coupled in flow communication between the primary fan vacuum box outlet 126 and fines conduit 172. The primary fan 128 pulls the outlet air from the outlet flow conduit 30, through the head box 140, through the screen 112 upper surface 114, through the primary fan vacuum box 122, and to the primary fan 128 for expulsion to fines conduit 172. The primary fan vacuum box 122 allows the primary fan 128 to generate enough vacuum on the jet drier 20 to transport the fiber from the jet drier 20 to the screen 112. The porous conveyor screen 112 retains a portion of the fibers from passing through to the primary fan 128. The porous conveyor screen 112 conveys the fibers away from the outlet flow conduit 30 and toward the second roller 120, by rotating about the first and second rollers 118 and 120. The fibers thus form a mat on the screen upper surface 114.

The vacuum or negative pressure is defined herein as the null. The null is an internal positive or negative pressure inside the jet drier 20 that is measured in the centrifugal part of the process air stream near the pulp intake 24 and between the pulp intake 24 and the fiber outlet 28 of jet drier 20. The null is a process control variable that has a direct affect on the through put of the jet drier 20 and the knot count of the fibers. The main variables that affect null are as follows: the vacuum generated by the primary fan 128 on the jet drier 20, feed rate of the feed pulp into the jet drier 20, moisture content of the feed pulp, non-uniformity in pulp size and shape, screen 112 speed and mesh size, pulp type and treatment, damper settings on the primary fan 128, and the temperature of process air fed into the jet drier 20 at the manifold 26. The screen 112 speed is a process control variable that has a direct affect on null. The rate at which the screen 112 transports the fibers from the outlet flow conduit 30 determines the thickness of the retained fibers being formed on the upper surface 114 of screen 112. The thickness of the retained fibers may constrict the volume of outlet air flowing through the system thus affecting the null. The jet drier 20 null is preferably maintained from 0 to −10 inches of water.

The primary fan 128 may be a side intake, high temperature, high volume exhaust fan. One suitable primary fan 128 for use in the present invention is a steel high temperature side intake material handling fan with a 10 hp motor with 460 VAC line voltage and may be connected with airtight seals to the primary fan vacuum box 122. An adjustable damper at the exhaust side controls the level of airflow through the primary fan 128 which has a direct affect on the jet drier 20 null, and therefore affects the end product fiber appearance and knot count.

Referring to FIGS. 7 and 8, the secondary fan vacuum box 130 is a plenum that allows the secondary fan 134 to pull air through the screen 112 to provide suction on the upper surface 114 of screen 112. Referring to FIG. 7, the secondary fan vacuum box 130 has an inlet 131 and outlet 132. The secondary vacuum box inlet 131 is slidably associated with the lower surface 116 of the screen 112 and is positioned below the upper portion 113 of screen 112 downstream from the primary fan vacuum box 122. The inlet to the secondary fan vacuum box 130 is positioned just downstream of the terminus of the head box 140. The secondary vacuum box outlet 132 is in flow communication with the secondary fan 134.

It will be understood that although the vacuum conveyor 110 has been described as having primary and secondary fans 128 and 134, a single fan device with dampers may serve as both the primary and secondary fans 128 and 134 without departing from the present invention. The fan vacuum boxes 122 and 130 may have a honeycomb shaped baffle to distribute the intake of fresh air through the mat of fibers on the screen upper portion 113.

Referring to FIG. 2, the vacuum conveyor 110 secondary fan 134 is coupled in flow communication between the secondary fan vacuum box outlet 132 and fines conduit 172. The secondary fan 134 provides a vacuum which pulls on the retained fibers being conveyed on the upper surface 114. The secondary fan 134 pulls air through the screen 112, through the secondary fan vacuum box 130, and to the secondary fan 134 for expulsion to fines conduit 172. The porous conveyor screen 112 prevents the fibers from passing through to the secondary fan 134. The secondary fan 134 retains the fibers on the screen 112 while the screen 112 is in motion and aids in the extraction and transport of the fibers by creating a vacuum that is strong enough to prevent the primary fan 128 from pulling fibers back into the head box 140. Without the secondary vacuum 134 to hold the fibers in place on the screen 112, the vacuum created by the primary fan 128 in the head box 140 may pull the fibers back into the head box 140. Without the secondary vacuum 134 the result could be a variable fiber thickness inside the head box 140 causing a fluctuation in null resulting in non-uniform deposition of fibers, inconsistent fiber separation in the end product, or process shut down because the fibers remain in and plug the head box 140.

The secondary fan 134 may be a side intake low velocity exhaust fan. One suitable secondary fan 134 for use in the present invention is a fan manufactured by Buffalo with a ¼ hp motor with 110 VAC line voltage. It has variable speeds and may be connected with airtight seals to the secondary fan vacuum box 130.

Referring to FIGS. 7 and 8, the vacuum conveyor 110 includes a support structure 135. The support structure 135 provides a surface to support the moving screen 112. The support structure 135 is shown extending between and supporting the first roller 118 and the second roller 120, along the same plane as that of the screen lower surface 116. The openings of the vacuum boxes are located in the support surface 135. It will be understood that, although shown as a single object, the support structure 135 may comprise many separate support structures unassociated with one another.

The vacuum conveyor 110 may optionally include a screen vacuum 137. The screen vacuum 137 removes any residual fibers from the screen 112 before the screen 112 receives new fibers from outlet flow conduit 30. The screen vacuum 137 may be located anywhere along screen 112 after the fiber has been removed. In one embodiment, the screen vacuum 137 is a vacuum manifold slidably associated with the upper surface 114 of screen 112, upstream of the head box 140. One suitable screen vacuum 137 for use in the present invention is a Sears Shop Vacuum and an unmodified vacuum attachment. Alternatively, the primary fan 128 may be used as the vacuum source for the screen vacuum 137. In another embodiment, an air supply device may be positioned on the opposite side of screen 112 from the screen vacuum 137 to force air through the screen 112 and into the screen vacuum 137.

The vacuum conveyor 110 may optionally include a separation device 138. The vacuum conveyor 110 separator device may be a thin physical barrier running across and slidably associated with the upper surface 114 of the screen 112 above the downstream end of the secondary vacuum box 130. The separation device 138 serves to loosen the retained fibers from the upper surface 114 of the screen 112 so that the fibers may easily be removed from the screen 112, for instance by gravity, at the vacuum conveyor 110 terminal end adjacent roller 120. The separator device 138 may also separate the fibers from the screen 112 and re-lay them on the screen 112. The fibers may then be collected at the fiber collection station 160 into a bulk mass which can be compressed into a bale for shipping to a customer. One suitable separation device 138 for use in the present invention is a blade made from Teflon sheet 0.030 inches thick by 2 inches wide placed at a 45 degree angle across the screen 112 at the downstream end of the secondary fan vacuum box 130 and secured at both ends of the separation device 138 to the support structure 135.

Alternatively, the separation device 138 may be a gas blowing device operatively associated with the screen 112, and located beneath the screen 112 downstream from the secondary vacuum box 130. The gas blowing separation device 138 would force gas up through screen 112 to separate the fibers from the screen.

The fiber separation station 100 includes a head box 140 coupled to the end of the outlet flow conduit 30, for slidably associating outlet flow conduit 30 with screen 112. The head box 140 is an apparatus where the separation of entrained fibers and outlet air occurs. In one embodiment, the head box 140 has a vacuum tight seal against upper surface 114 of the screen 112 where the outlet air and fines are removed. The fibers are trapped on the moving screen 112 and the outlet air and fines pass through the mat of fiber and through the screen 112.

Figure 9:
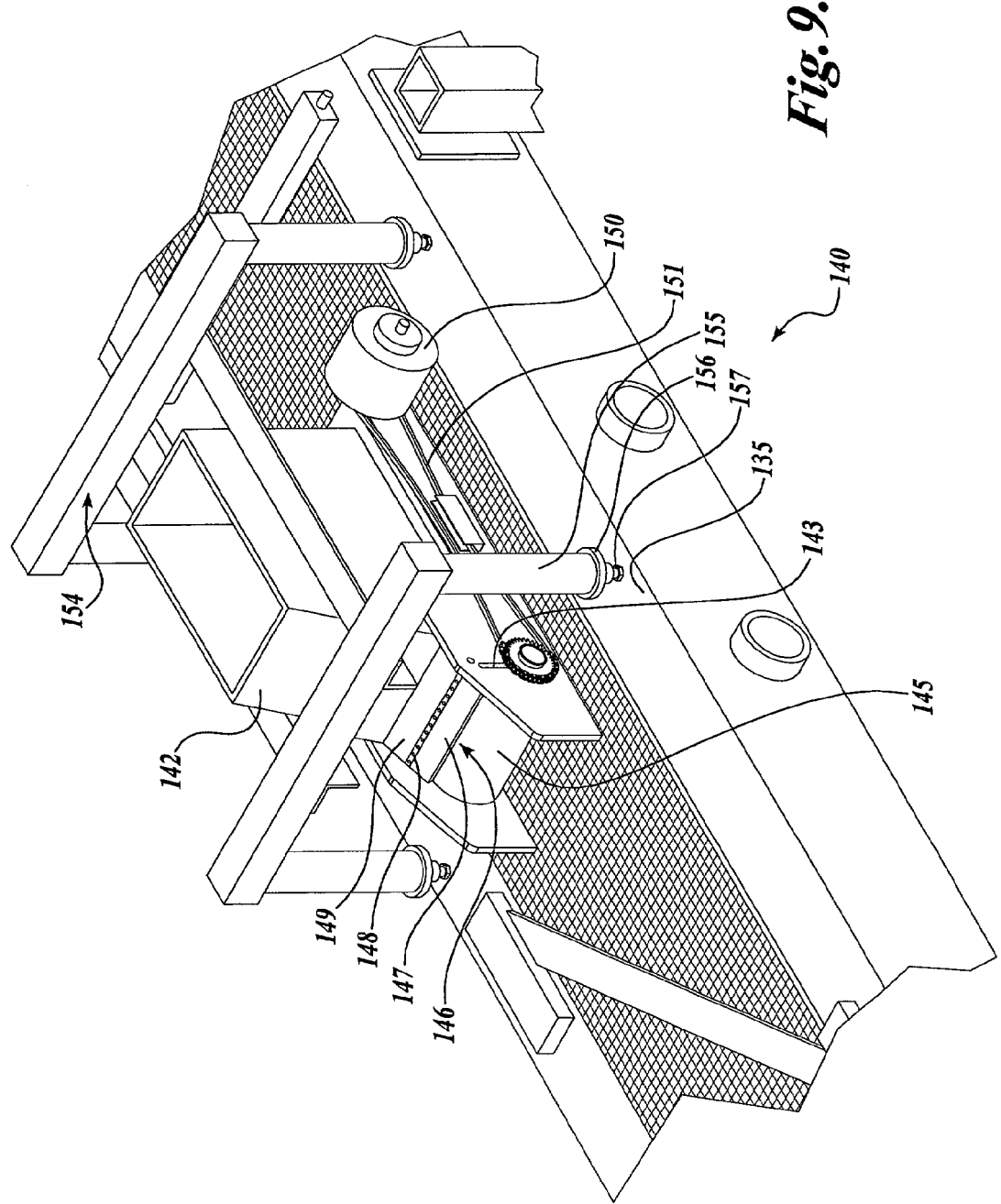
FIG. 9 is an enlarged perspective view of the fiber separation station of the present invention.

Referring to FIG. 9, the head box 140 includes a head box shell 142, an out feed roller 145 and a dynamic lip seal 146. The head box shell 142 is in flow communication between the outlet flow conduit 30 and the upper surface 114 of the screen 112. The head box 140 out feed roller 145 is positioned at the downstream end of head box shell 142 (also referred to as the outlet side of the head box shell 142). The head box 140 out feed roller 145 is rotatably and movably coupled to the head box shell 142, and rollably associated with the upper surface 114 of the screen 112. The dynamic lip seal 146 is positioned above the out feed roller 145 at the downstream end of box shell 142. The dynamic lip seal 146 is hingedly coupled to the head box shell 142, and slidably associated with the out feed roller 145.

The head box 140 may be composed of a low friction material, wherever moving parts are in contact. For instance, the head box shell 142 may be composed of Teflon where the head box shell 142 contacts the screen 112. Additionally, the head box shell 142 may be composed of Teflon where the head box shell 142 contacts the out feed roller 145.

The head box shell 142 preferably includes vertically oriented slots 143. The axles of the out feed roller 145 are positioned in the slots 143. The slots 143 allow the out feed roller 145 to move in an up and down manner to adjust for the varying thickness of the fibers on screen 112.

The out feed roller 145 is positioned at the downstream end of head box 140 to provide a force for pulling the fibers along the screen 112 and out of the head box 140. The out feed roller 145 may otherwise be a belt or rotor, or other similar device. The out feed roller 145 may be powered by any conventional source. The bottom surface of the out feed roller 145 provides an additional force for pulling the fibers along the screen 112 and out of the outlet flow conduit 30. The out feed roller 145 may be made from Teflon coated steel.

The dynamic lip seal 146 allows the head box 140 to maintain a vacuum tight seal against upper surface 114 of the screen 112. The dynamic lip seal 146 seals the out feed roller 145 to the head box shell 142. This design allows the out feed roller 145 to rotate and travel vertically to compensate for non-uniform fiber thickness at the out feed of the head box 140, without drawing tramp air from around the out feed roller 145. The dynamic lip seal may be made from an inflexible piece 147 joined to a flexible piece 149 by a pivot portion 148. The pivot potion 148 is rotatably coupled to the head box shell 142. The inflexible piece 147 moves up and down in response to the motion of out feed roller 145. The flexible piece 149 allows the inflexible portion to move, while maintaining a vacuum seal against the head box shell 142. The inflexible piece 147 and the flexible piece 149 may be formed of Teflon having differing thickness.

Optionally, the head box 140 further may include a pair of drive wheels 150 for driving the out feed roller 145. The drive wheels 150 are rotatably coupled to the upstream end of head box shell 142, in driving communication with the out feed roller 145, and also in mechanical communication with the screen 112. The drive wheels 150 rotate in response to the movement of screen 112 and transfer that movement to the out feed roller 145 to rotate the out feed roller 145. The drive wheels 150 drive the out feed roller 145 with the use of a coupling device 151. The coupling device 151 may be a chain coupling or any other device capable of mechanically associating the drive wheels 150 and out feed roller 145 to turn in unison. It is preferred that the drive wheels 150 be coupled to the out feed roller 145 at a 1:1 ratio, to enable the surface of out feed roller 145 to rotate at the same rate as screen 112.

The head box 140 may also include a height adjustment structure 154. The height adjustment structure 154 is connected to the head box shell 142 and to the support structure 135. The height adjustment structure 154 enables space between the head box shell 142 and screen 112 to be adjusted. The height adjustment structure 154 includes a frame 155, an adjustment nut 156, and an adjustment bolt 157. The frame 155 is connected to the head box shell 142. The adjustment bolt 157 is connected to the support structure 135. The adjustment nut 156 is adjustably connected to the adjustment bolt 157 and is also connected to the frame 155. As the adjustment nut 156 is adjusted along the adjustment bolt 157, the adjustment nut 156 acts on the frame 155 to increase or decrease the space between the head box shell 142 and screen 112.

Alternatively the fiber separation station 100 may be a cyclone, bag house, or other similar device for removing fines and fiber together from outlet air. The fiber separation station 100 may then recycle the separated outlet air back to the air supply station 90. In this embodiment, the fines removal station 170 may be located upstream along conduit 30, to remove the fines from the fibers prior to the fibers being recovered at the fiber separation station 100.

Referring again to FIG. 2, the drying system 10 fines removal station 170 receives outlet air and fines from the fiber separation station 100. The fines removal station 170 is coupled in flow communication with the fines conduit 172 and the air conduit 182. The fines removal station receives fines and outlet air from fines conduit 172, removes at least a portion of the fines, and discharges the outlet air to the air conduit 182. The fines removal station 170 may then recycle the outlet air back to the air supply station 90. The fines removal station 170 may be a cyclone, bag house, or other similar device.

Alternatively, the fines removal station 170 is coupled to the outlet flow conduit 30 between the jet drier 20 and the fiber separation station 100. The fines removal station 170 in this embodiment may include a cyclone similar to that used as a dust collector for sawdust in wood shops. The fines removal station 170 receives outlet air, fines, and fibers from the jet drier; removes at least a portion of the fines; and sends the fiber coming from the jet drier 20 to the fiber separation station 100. The fines removal station 170 of this embodiment may further include a second cyclone, bag house, or other similar device located at the primary and secondary fan 128 and 134 outlets. This second cyclone may also receive the filtered fines exhaust from the first cyclone.

The drying system 10 noise reduction station 180 is inserted into air conduit 182 and in flow communication with the fines removal station 170 via air conduit 182. The noise reduction station 180 provides a reduction in the noise produced by the drying system 10. The noise reduction station 180 receives outlet air from the fines removal station 170 via air conduit 182, absorbs kinetic energy from the outlet air, and discharges the outlet air via air conduit 182. The discharged outlet air may be vented to the atmosphere or recycled to the air supply station 90.

Alternatively the noise reduction station 180 is directly coupled to the primary and secondary fans 128 and 134. The noise reduction station 180 may be a cyclone ducted to the exhaust from the primary fan 128. The exhaust from the primary fan 128 is discharged into the input side of the cyclone and the cyclone outlet ports are independently vented to atmosphere. The exhaust from the secondary fan 134 may be vented to the cyclone or to the cyclone outlet ports. Additionally, the fines removal station 170 may also serve as a noise reduction station.

Figure 13:
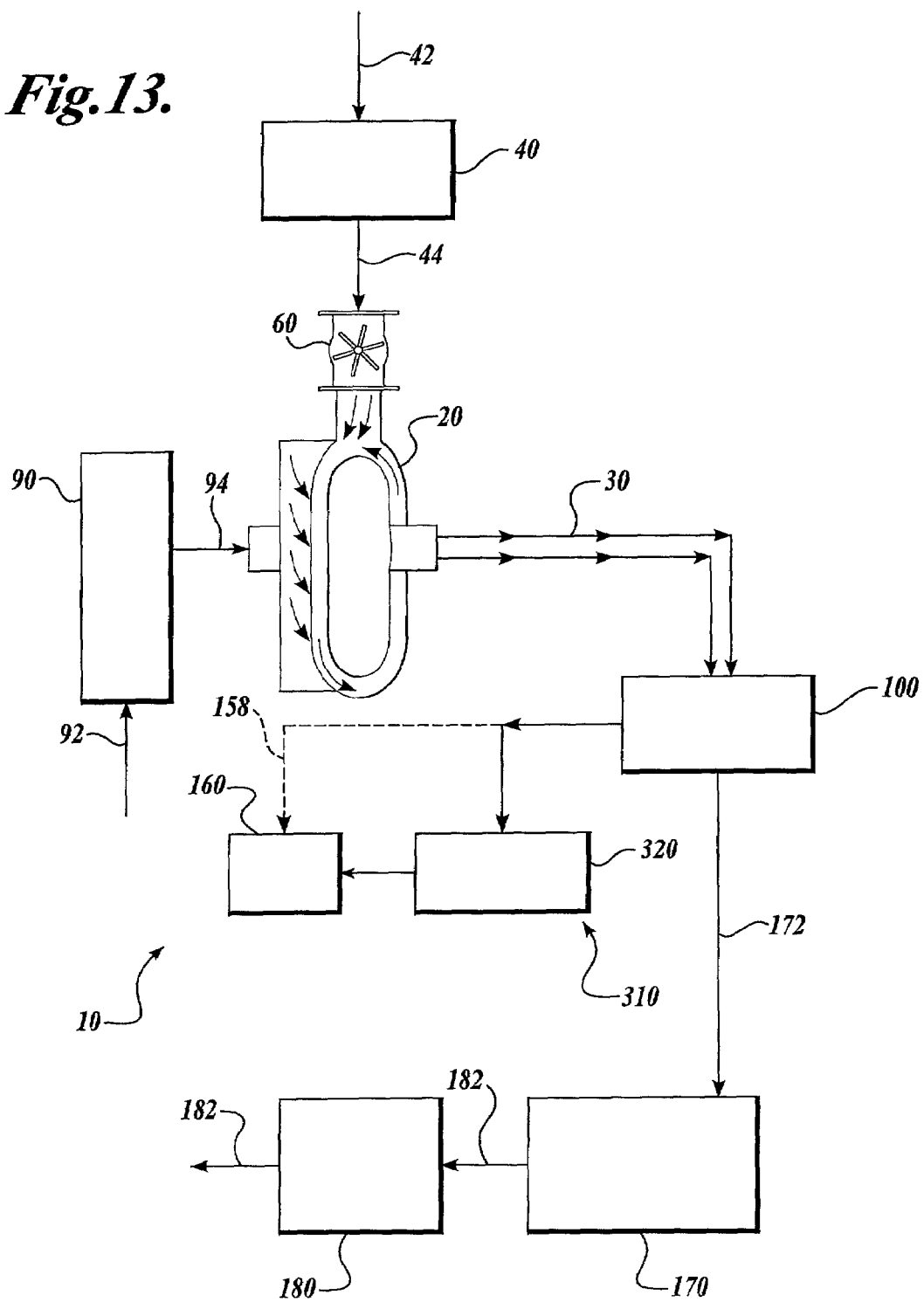
FIG. 13 is a schematic diagram of the drying system of the present invention including a curing station.

Referring to FIG. 13, to produce crosslinked fibers, the drying system 10 may optionally include a curing station 310. The curing station 310 receives fibers from the fiber separation station 100. The crosslinker treated fibers are cured in the curing station 310. Optionally, the crosslinker containing fibers are sent directly to the fiber collection station 160 along flow path 158, but only if the crosslinker is adequately cured in the jet drier 20. However, complete crosslinking in the jet drier may not be achieved in the relatively short time in which the fibers conventionally transit through the drier. In one embodiment, the curing station 310 includes a curing oven 320 operatively associated with the fiber separation station 100 to receive fibers from the fiber separation station 100. The curing oven 320 is coupled in flow communication with the fiber collection station 160. The fibers from the fiber separation station 100 are delivered to the curing oven 320, the curing oven 320 cures the crosslinker treated fibers, and the cured fibers are sent to the fiber collection station 160.

Referring to FIG. 14, the curing station 310 alternatively includes a flash drier 340 in addition to curing oven 320. The flash drier 340 is operatively associated with the fiber separation station 100, to receive crosslinker treated fibers from the fiber separation station 100. The flash drier 340 further dries the crosslinker treated fibers. The curing oven 320 is operatively associated with the flash drier 340, to receive the further dried fibers from the flash drier 340. The curing oven 320 is also coupled in flow communication with the fiber collection station 160. The fibers from the flash drier 340 are delivered to the curing oven 320, the curing oven 320 cures the further dried fibers, and the cured fibers are sent to the fiber collection station 160.

It will be understood that although the fiber collection station 160 and the curing station 310 have been described as being separate devices, the fiber collection station 160 and the curing station 310 may be a unitary device. For instance, the vacuum conveyor 110 may be equipped so that the screen 112 passes through a curing oven 320.

The drying system 10 described above forms singulated and dried fibers. The process takes wet pulp directly from a pulp mill and produces a singulated product from the never-dried pulp by using a drying process that singulates the pulp directly. This avoids the intermediate steps of the pulp drier, handling of the pulp reels and rolls, and hammermilling in a traditional process. The drying system 10 produces fibers having a low knot and fines content. These fibers also have physical characteristics such as kink, curl, and individual twist that are more pronounced than fibers processed by hammermilling. The drying system 10 may also produce fibers that have been treated with a treatment substance. The treatments that can be performed on the pulp may be difficult or impossible to perform on a roll of dried pulp. Treatments can be done on the pulp that reduce the amount of knots, increase production rate, and/or form fibers having desirable characteristics.

Where the fibers have been treated with a crosslinker, it is preferred that the dried, crosslinked, and singulated fibers produced in drying system 10 have a knot count equal to or less than 15%, more preferably equal to or less than 10%, more preferably equal to or less than 5%, and most preferably equal to or less than 2%. Where the fibers have been treated with an additional treatment substance selected from the group consisting of surfactant or mineral particulate material, the fibers have a knot count equal to or less than 15%, more preferably equal to or less than 10%, more preferably equal to or less than 5%, and most preferably equal to or less than 2%.

It is preferred that the dried, crosslinked, and singulated fibers produced in drying system 10 have a fines count equal to or less than 21%, more preferably equal to or less than 15%, and most preferably equal to or less than 13%. Where the crosslinked fibers have been further treated with a treatment substance of surfactant, the fibers have a fines count equal to or less than 21%, preferably equal to or less than 15%, and more preferably equal to or less than 13%. Where the crosslinked fibers have been further treated with a treatment substance of mineral particulate, the fibers have a fines count equal to or less than 21%.

It is preferred that the dried, crosslinked, and singulated fibers produced in drying system 10 have low knot counts, high accepts counts, and low fines counts. The crosslinked fibers have a knots count equal to or less than 5%, an accepts count equal to or greater than 80%, and a fines count equal to or less than 15%; preferably a knots count equal to or less than 5%, an accepts count equal to or greater than 80%, and a fines count equal to or less than 13%; more preferably a knots count equal to or less than 5%, an accepts count equal to or greater than 85%, and a fines count equal to or less than 15%; and most preferably a knots count equal to or less than 2%, an accepts count equal to or greater than 80%, and a fines count equal to or less than 15%. Where the crosslinked fibers have been additionally treated with a treatment substance of surfactant, the fibers have a knots count equal to or less than 5%, an accepts count equal to or greater than 80%, and a fines count equal to or less than 15%; preferably a knots count equal to or less than 5%, an accepts count equal to or greater than 80%, and a fines count equal to or less than 13%; more preferably a knots count equal to or less than 5%, an accepts count equal to or greater than 85%, and a fines count equal to or less than 15%; and most preferably a knots count equal to or less than 2%, an accepts count equal to or greater than 80%, and a fines count equal to or less than 15%. Where the crosslinked fibers have been additionally treated with a treatment substance of mineral particulate, the fibers have a knots count equal to or less than 2%, an accepts count equal to or greater than 77%, and a fines count equal to or less than 21%; and preferably a knots count equal to or less than 1.6%, an accepts count equal to or greater than 77%, and a fines count equal to or less than 21%.

It is preferred that the dried, crosslinked, and singulated fibers produced in drying system 10 have a density from 15 to 100 kg/m$^3$, more preferably a density from 25 to 70 kg/m$^3$, and most preferably a density from 30 to 60 kg/m$^3$. These fibers may later be pressed into a more compact form if desired.

Figure 10:
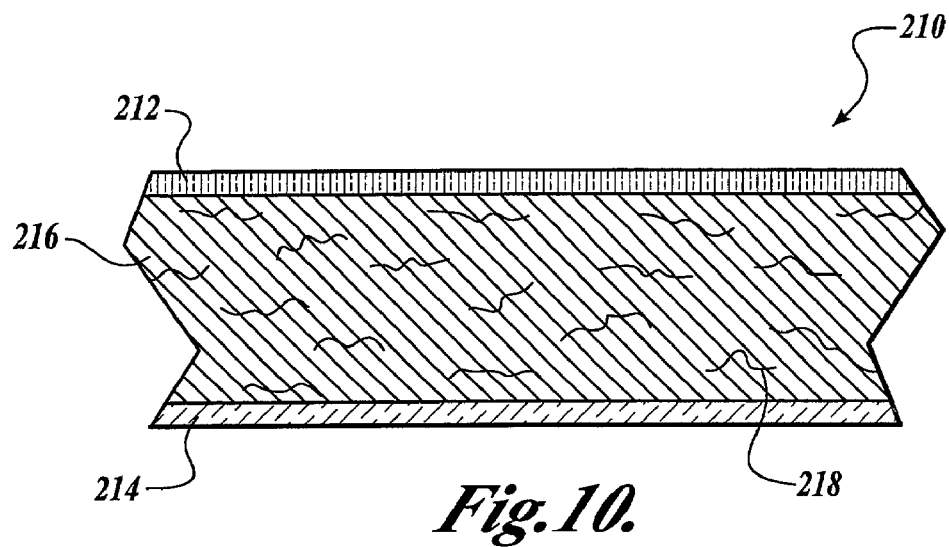
FIG. 10 is a schematic diagram of an absorbent article of the present invention.

The dried, crosslinked, and singulated fibers produced in drying system 10 may be used in any number of end products including but not limited to absorbent articles, concrete products, plastic products, filter product, and paper products. Referring to FIG. 10, the absorbent article 210 includes a pervious top portion 212, an impervious bottom portion 214, and an absorbent layer 216 located between the pervious top portion 212 and the impervious bottom portion 214. The absorbent layer 216 includes singulated and dried fibers 218. It will be understood that the term absorbent article, as used herein, includes but is not limited to diapers, tampons, sanitary napkins, incontinence guards, bandages and meat and poultry pads.

Figure 11:
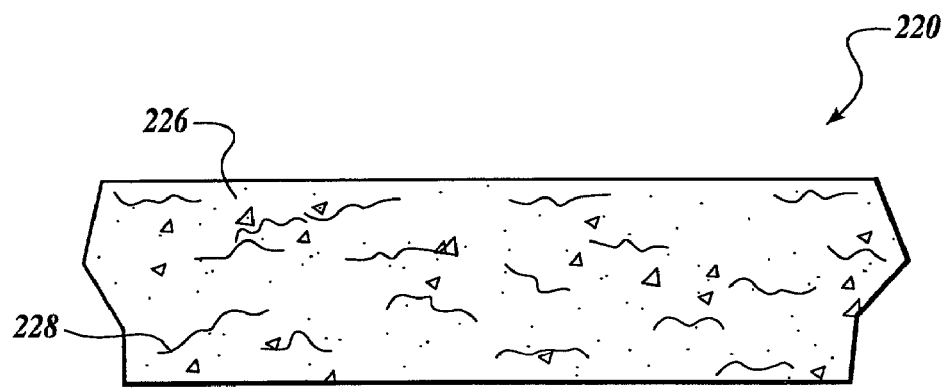
FIG. 11 is a schematic diagram of a concrete or plastic product of the present invention.

Referring to FIG. 11, the concrete product 220 includes a concrete matrix 226 having singulated and dried fibers 228 incorporated therein. It will be understood that the term concrete products, as used herein, includes but is not limited to cement, concrete, mortars, precast material, high strength cement products, extruded cement products, gypsum products, and any other cementitious material. It will be understood that while FIG. 11 has been illustrated as a concrete product 220, FIG. 11 may also show a plastic product 220 including a plastic matrix 226 having singulated and dried fibers 228 incorporated therein. It will be understood that the term plastic products, as used herein, includes but is not limited to plastics and rubbers.

Figure 12:
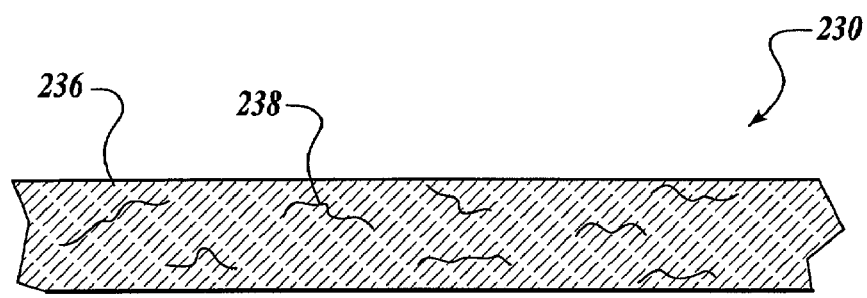
FIG. 12 is a schematic diagram of a paper or filter product of the present invention.

Referring to FIG. 12, the paper product 230 includes a paper sheet 236 having singulated and dried fibers 238 incorporated therein. It will be understood that the term paper products, as used herein, includes but is not limited to paper and paperboard. It will be understood that while FIG. 12 has been illustrated as a paper product 230, FIG. 12 may also show a filter product 230 having singulated and dried fibers 238 incorporated therein.

EXAMPLES

In the processing of pulp into dry singulated fibers used in the examples below, several process conditions were evaluated. The effects of variations in the jet drier temperature, feed rate, treatment application, types of pulp, feed rate, and pre-drying dewatering methods were all explored in the Examples below.

Unless otherwise noted, the apparatus used for the Examples below is as follows: pulp was dried and singulated into fibers using a Fluid Energy Aljet Model 4 Thermajet, X0870L jet drier. No modifications were made to the Model 4 Thermajet. The pulp was fed to the jet drier in several different apparatuses. For large runs a shaftless screw conveyor manufactured by Martin Sprocket and Gear, Inc., Martin Conveyor Division was used. It had a hopper at the lower end of the conveyor for placing the wet pulp, and conveyed the wet pulp up an incline that rose up towards the pulp feed device on the jet drier. For runs of low quantities of pulp, a Weyerhaeuser designed and manufactured conveyor with hopper type feeder for feeding wet pulp was used. For feeding fibers suspended in a foam medium a Weyerhaeuser redesigned and modified Oakes mixer was used to directly inject foamed pulp into the jet drier.

In Examples 1–9, the feed pulp used was a pressed wet web of pulp having a basis weight of a substantial amount to provide sufficient stiffness to feed the web into a shredding device. The wet web was produced on a pilot paper-machine that had a spray system attached to it to allow treatment of the wet web prior to pressing. A basis weight of 500 to 1500 gsm was found to work adequately. The web was fed into the shredding device through a rotating and reversible roller nip and into a rapidly rotating set of rolls containing protruding pins that tore the web into small pieces of pulp.

The feed pulp was delivered to the jet drier using a stainless steel Prater Industries Rotary Air Lock Feeder model number PAV-6C having a rotor housing, and a CLSD, SS,PAV-6 rotor with six rotor vanes. The refitted rotor was a custom modified six vane closed end rotor that was reduced in diameter to give more clearance between the vane and rotor housing so wet pulp could be run through the feeder without damaging fibers or jamming the rotor.

The feed air was delivered to the jet drier with a Roots-Dresser universal rotary lobe blower air pump with silencer and filtration. The model number was 45 URAI. The flow rate was 300 SCFM. The delivered pressure was 5 PSIG. The pump speed was 3176 RPM. The drive motor was an electric Lincoln 15 hp that was running at 1800 RPM. The air pump had an inlet silencer type CCF-4 with a paper element and a discharge silencer type Universal SD-4. The assembly had a gauge range of 0 to 15 psig and it was fitted with a pressure relief valve set at 6 psig.

The feed air was heated with a Watlow Electric Immersion air heater, model number 700-96BD2459. The air heater used 480 VAC line voltage, and had a pressure rating of 150 psig at 1,050° F. The over temperature protection used a type K thermocouple and a Watlow series 92 controller. The process temperature regulator used type J thermocouples and Watlow series 965 auto tuning controller.

A material handling fan (MHF) was placed in the ducting between the jet drier and the vacuum conveyor. The MHF was used in Examples 1–8, but was not used in Examples 9–24.

The outlet air, fibers and fines were delivered to a custom designed vacuum conveyor via a head box sealed to the conveyor screen. A Sears Shop Vacuum with an unmodified vacuum attachment was used for the screen vacuum. The primary fan was a steel high temperature side intake material handling fan with airtight seals to the primary fan vacuum box. The primary fan had a 10 hp motor with 460 VAC line voltage. An adjustable damper at the exhaust side controlled the level of airflow through the fan which had a direct effect on the jet drier null, which created a vacuum of −1 to −5 inches of water. The exhaust from the primary fan discharged into a cyclone that currently serves the purpose of noise reduction. The secondary fan was manufactured by Buffalo and had a ¼ hp motor with 110 VAC line voltage. The secondary fan had variable speeds and was connected with airtight seals to the secondary fan vacuum box. The secondary fan discharged to the exhaust side of the cyclone. The separation device was made from Teflon sheet 0.030 inches thick by 2 inches wide placed at a 45 degree angle across the conveyor screen at the down stream end of the secondary fan vacuum box.

In the examples below, "sonic knots" were tested by the following method for classifying dry fluffed pulp into three fractions based on screen mesh size. The first fraction is the knots and is defined as that material that is captured by a No. 12 mesh screen. The second fraction is the accepts or the singulated fibers and is defined as that material that passes through a No. 12 mesh screen but is captured by a No. 60 mesh screen. The third fraction is of the fines and is defined as that material that passes through a No. 12 and through a No. 60 mesh screen. The separation is accomplished by sound waves generated by a speaker that are imposed upon a pre-weighed sample of fluff pulp placed on a No. 5 mesh screen that is near the top of a separation column where the speaker sits at the very top. After a set period of time, each fraction is removed from the separation column and weighed to obtain the weight fraction of knots, accepts/singulated fiber and fines.

Example 1

Singulated dried Douglas fir fiber and treated dried Southern pine fiber was produced by making wet rolls of pulp on a pilot papermachine and hand feeding the wet rolls into the shredding device and drier system described above. Some untreated (as is) bleached Southern pine and Douglas fir rolls were dried. Additional Southern pine rolls were treated then dried. The treatments on the separate runs of the Southern pine feed pulp were as follows: 1. Citric acid; 2. Glyoxal; 3. Clay; 4. Hydrophobic latex and fly ash; 5. Hydrophobic latex, fly ash and superplasticizer; 6. Glyoxal, hydrophobic latex, fly ash, and superplasticizer; 7. Glyoxal, hydrophobic latex, fly ash, methyl cellulose, and superplasticizer; 9. clay; 10. fly ash. The feed rate of the pulp was 25–111 g/min OD (oven dried). The solids content was approximately 28% in the rolls prior to drying. The outlet temperature of the drier ranged from 180° C. to 200° C. The inlet temperature was varied to attain the outlet temperature. Table 1 summarizes these runs and treatments. The clay and fly ash treated pulp appeared to fiberize the best. The pulp with methyl cellulose was difficult to run and fiberize. The other runs appeared to fiberize similar to untreated pulp. Sonic knots were not measured on these samples.

TABLE 1

Fiber treatment.

| Run # | Citric Acid Cross-Linker (XLC) | Glyoxal Cross-Linker (XLG) | Latex (L) | Clay (CL) | Fly Ash (FA) | Methyl Cellulose (MC) | Super-plasticizer (SP) | Outlet temp. (° C.) | Feed Rate G/MIN OD |
|---|---|---|---|---|---|---|---|---|---|
| 1 | ✓ | | | | | | | 200/180 | 73.9 |
| 2 | | ✓ | | | | | | 200/180 | 63.4 |
| 3 | | | ✓ | | | | | 180 | 29.6 |
| 4 | | | | ✓ | ✓ | | | 200 | 113.3 |
| 5 | | | | ✓ | ✓ | | ✓ | 200 | 69.1 |
| 6 | | ✓ | | ✓ | ✓ | | ✓ | 200 | 98.8 |
| 7 | ✓ | ✓ | | | ✓ | ✓ | ✓ | 200 | 95.6 |
| 8 | | | | | | | | 180 | 24.8 |
| 9 | | | | | ✓ | | | 200 | 105.4 |
| 10 | | | | ✓ | | | | 200 | 81.0 |
| 0a | | | | | | | | 200/180 | 52.5 |
| 0b | | | | | | | | 180 | 24.8 |

Example 2

Unbleached and untreated singulated dried fiber was produced by making wet roll of unbleached Douglas fir (DF) pulp on a pilot papermachine and hand feeding the wet rolls into the shredding device and drier system described above. The dried fiber was collected and tested for sonic knots which were 5% at one feed rate (in rpm of the feed roller motor into the shredder) and 15% at a higher feed rate. The outlet temperature was maintained at 180° C. for both runs. The fines content was about 11% at the lower feed rate and 12% at the higher feed rate. The accepts were 83% at the lower feed rate and 74% at the higher feed rate. Table 2 summarizes the data.

TABLE 2

Varying feed rate effects on untreated roll samples.

| Run # | Pulp | Knots (%) | Accepts | Fines | Feed Rate Speed | Outlet Temp. (° C.) |
|---|---|---|---|---|---|---|
| 11 | DF | 14.73 | 74.13 | 11.13 | 300 | 180 |
| 12 | DF | 5.07 | 83.07 | 11.87 | 250 | 180 |

Example 3

Bleached and untreated singulated dried fiber samples were produced by making wet rolls of bleached Douglas fir pulp on a pilot papermachine and hand feeding the wet rolls into the shredding device and drier system described above. The dried fiber was collected and tested to determine the effect of outlet temperature and feed rate on sonic knots and also the effect on fiber strength as measured by wet zero span tensile strength (ZST). The t86% gives a value to establish the lower and upper limits of the error range for the ZST results. There was no statistically significant change in fiber strength. It was found that a higher feed rate produced a higher amount of knots and a higher outlet temperature produced more knots. Table 3 shows the results.

TABLE 3

Jet drier runs showing effect of temperature and feed rate on knots and ZST.

| Run # | ZST Index (Nm/g) | t86% | Knots (%) | Accepts (%) | Fines (%) | Shredder Speed | Outlet Temp. (° C.) | Feed Rate (g OD/min) |
|---|---|---|---|---|---|---|---|---|
| Control | 108 | 10.6 | | | | | | |
| 13 | 106 | 5.7 | 20.53 | 66.87 | 12.60 | 300 | 160 | 70 |
| 14 | 103 | 1.4 | 19.87 | 65.60 | 14.53 | 300 | 170 | 70 |
| 15a | 105 | 4.9 | 25.00 | 63.67 | 11.33 | 300 | 180 | 70 |
| 15b | 101 | 4.9 | 47.33 | 41.27 | 11.40 | 500 | 180 | 116 |
| 15c | 95 | 2.8 | 6.40 | 78.33 | 15.27 | 125 | 180 | 29 |
| 16 | 103 | 3.5 | 26.53 | 60.87 | 12.60 | 300 | 190 | 70 |
| 17 | 99 | 4.9 | 41.93 | 47.20 | 10.87 | 300 | 200 | 70 |

Example 4

Bleached and untreated singulated dried Douglas fir fiber samples were produced by slushing wet lap and dewatering it by using a centrifuge and then hand feeding the pulp on a belt conveyor into the drier system described above. The dried fiber was collected and tested to determine the effect of various wet pulp preparation methods. The wet pulp preparation methods included centrifuged, centrifuged and pin-fluffed, and centrifuged and wetted. Sonics knot levels were tested and the results are shown in Table 4 where it can be concluded that just centrifuging provides the lowest sonic knots at 14.2%.

TABLE 4

Jet drier runs showing effect of pulp preparation on sonic knots.

| Run # | Sample Preparation | Knots (%) | Accepts (%) | Fines (%) | Inlet Temp. (° C.) |
|---|---|---|---|---|---|
| 18 | Centrifuge & Fluffed | 17.9 | 69.5 | 12.7 | 220 |
| 19 | Centrifuged | 14.2 | 71.4 | 14.4 | 220 |
| 20 | Centrifuged & Wetted | 16.7 | 70.7 | 12.6 | 220 |

Example 5

Fly ash treated and untreated bleached singulated dried Douglas fir fiber samples were produced by slushing wet lap and dewatering it by using a centrifuge and then hand feeding the pulp on a belt conveyor into the drier system described above. The fly ash containing pulp was made by adding 20% by weight fly ash with high molecular weight anionic retention aid to the slush pulp prior to centrifuging. The dried fiber was collected and tested to determine the effect of inlet temperature and fly ash on sonic knots. The results are shown in Table 5 where it can be seen that fly ash treatment dramatically reduces knots from a high of 20% to a low of 1% by weight. Also it can be seen for these runs that increased inlet temperature and outlet temperature slightly reduced knots.

TABLE 5

Singulated Douglas fir pulp with and without fly ash.

| Run # | Sample Preparation | Fly Ash (%) | Knots (%) | Ac- cepts (%) | Fines (%) | Inlet Temp. (° C.) | Outlet Temp. (° C.) |
|---|---|---|---|---|---|---|---|
| 21a | Centrifuged, fluffed | | 20.40 | 66.73 | 12.87 | 260 | 160 |
| 21b | Centrifuged | | 14.13 | 74.40 | 11.47 | 260 | 180 |
| 21c | Centrifuged, fluffed | | 16.13 | 72.93 | 10.93 | 300 | 180 |
| 22a | Centrifuged, fluffed | FA 20% | 1.07 | 80.00 | 18.93 | 260 | 180 |
| 22b | Centrifuged, fluffed | FA 20% | 1.27 | 79.00 | 19.73 | 230 | 180 |

Example 6

Singulated dried fiber was produced from never dried unbleached pulp taken from a double roll press in a commercial mill after deflaking. The pulp was run as collected from the mill and no treatments were done on it. The results are provided in Table 6 which shows that the knots ranged from 0.75 to 2.37 percent. Increasing outlet temperature by decreasing feed rate resulted in a slight decrease in knots. Increasing inlet temperature by increasing feed rate increased knots slightly. Washing, centrifuging and fluffing increased knots slightly. Re-heating the pulp appeared to have no effect. The "kappa" number is a measure of the amount of lignin remaining in the pulp post pulping, and is quantified by the Tappi Standard Test Methods test number T-236.

TABLE 6

Untreated centrifuged Douglas fir unbleached samples from double roll press. Effect of kappa #, pulp temperature and sample preparation.

| Run # | Pulp | Sample Preparation | Kappa # | Knots | Accepts | Fines | Inlet Temp. (° C.) | Outlet Temp. (° C.) |
|---|---|---|---|---|---|---|---|---|
| 23a | DF | As-is | 25 | — | — | — | 230 | 150 |
| 23b | DF | As-is | 25 | 0.90 | 83.92 | 15.18 | 240 | 150 |
| 23c | DF | As-is | 25 | 1.36 | 85.95 | 12.70 | 250 | 155 |
| 23d | DF | As-is | 25 | 1.27 | 83.60 | 15.13 | 260 | 160 |
| 23e | DF | As-is | 25 | 1.80 | 76.33 | 21.87 | 300 | 220 |
| 23f | DF | As-is | 25 | 1.49 | 80.98 | 17.53 | 260 | 160 |
| 23g | DF | As-is | 25 | 1.29 | 81.04 | 17.67 | 260 | 180 |
| 23h | DF | As-is | 25 | 0.75 | 84.10 | 15.15 | 300 | 180 |
| 24a | DF | As-is heated pulp | 25 | 1.16 | 82.41 | 16.43 | 260 | 160 |
| 24b | DF | As-is heated pulp | 25 | 1.97 | 81.89 | 16.13 | 260 | 180 |
| 25a | DF | As-is | 12 | 2.37 | 79.21 | 18.42 | 260 | 160 |
| 25b | DF | As-is | 12 | 1.82 | 82.19 | 15.99 | 260 | 180 |
| 25c | DF | As-is | 12 | 2.31 | 80.75 | 16.95 | 300 | 180 |
| 26a | DF | Washed, Centrifuged, fluffed | 25 | 2.60 | 82.93 | 14.47 | 260 | 160 |
| 26b | DF | Washed, Centrifuged, fluffed | 25 | 1.87 | 82.80 | 15.33 | 260 | 180 |

Example 7

Bleached and untreated singulated dried fiber samples were produced by making wet rolls of bleached Douglas fir pulp on a pilot papermachine and hand feeding the wet rolls into the shredding device and drier system described above. The knots for this system were high at 34% indicating that feeding pulp directly is better than forming a wet web and shredding the web during feed.

Example 8

Bleached and untreated singulated dried fiber samples were produced by pin-fluffing never-dried Southern pine and feeding the pulp by placing it into a foam feed system where water and surfactant are injected and mixed with the wet pulp providing a flowable mix that can be fed into the jet drier system. The knots were less than 2% but the fines amount has gone up to almost 20% compared to previous runs.

Example 9

An unbleached and untreated singulated dried fiber sample was produced by running the pulp as obtained from a mill in the drying system described above without the material handling fan between the drier and the vacuum conveyor. Compared to previous runs, the knots increased slightly from 1.8% to 3.5% for the same temperatures.

Example 10

An unbleached and untreated singulated dried fiber sample was produced by running the pulp as obtained from a mill in the drying system described above without the material handling fan between the drier and the vacuum conveyor. Compared to previous runs, the knots increased slightly from 1.3% to 2.6% for the same temperatures. A bleached control sample had a slight increase in knots from 20.4 to 21.9%.

Example 11

A bleached dissolving grade fiber was dried using the drying system described above. The pulp had about 10% knots. The moisture was less than 2% which is typically too low. Dissolving tests showed that the fiber performed about the same as typical commercial grade pulp.

Example 12

Bleached singulated fiber was produced with the drying system described above to compare the effect of dewatering process on knots. Screwpressed pulp was compared to centrifuged pulp and centrifuged control wet lap pulp. The results are in Table 12 which shows that centrifuging provides a lower amount of knots.

TABLE 12

Runs to determine difference between screw-pressed, centrifuged wet lap, and centrifuged slush.
Two levels of spring pressure were used on the press.

| Run # | Sample Preparation | Spring Pressure | Average Knots, % | Knots | Accepts | Fines | Inlet Temp. (° C.) | Outlet Temp. (° C.) |
|---|---|---|---|---|---|---|---|---|
| 32a | Screwpressed bleached DF slush | High | | 19.3 | 61.5 | 19.3 | 260 | 180 |
| 32b | Screwpressed bleached DF slush | High | | 25.7 | 61.1 | 13.3 | 280 | 180 |
| 32c | Screwpressed bleached DF slush | High | | 25.6 | 59.9 | 14.5 | 280 | 200 |
| 32e | Screwpressed bleached DF slush | Low | | 27.9 | 57.7 | 14.3 | 280 | 180 |
| 32f | Screwpressed bleached DF slush | Low | 22.3 | 13.3 | 66.7 | 20.0 | 260 | 180 |
| 33a | Control, Centrifuged wetlap | | | 20.1 | 61.7 | 18.1 | 260 | 180 |
| 33b | Control, Centrifuged wetlap | | | 16.6 | 65.5 | 17.9 | 270 | 200 |
| 33c | Control, Centrifuged wetlap | | | 26.3 | 59.1 | 14.5 | 280 | 180 |
| 33d | Control, Centrifuged wetlap | | 21.1 | 21.3 | 65.1 | 13.6 | 280 | 200 |
| 34a | Centrifuged Slush | | | 20.8 | 64.0 | 15.2 | 260 | 180 |
| 34b | Centrifuged Slush | | | 15.6 | 68.0 | 16.4 | 260 | 200 |
| 34c | Centrifuged Slush | | | 14.6 | 67.9 | 17.5 | 280 | 180 |
| 34d | Centrifuged Slush | | 17.6 | 19.2 | 67.5 | 13.3 | 280 | 200 |

Example 13

Crosslinked bleached singulated fiber was produced with the drying system described above to determine the ability of the drier to run crosslinked treated pulp. As with other grades of pulp, a low amount of knots is desirable with crosslinked pulp. Two runs were done at different temperatures as shown in Table 13. Polyacrylic acid (PAA XL) was added to the pulp at approximately 5% by weight on pulp. Post curing was done to complete the reaction. The data shows that the higher temperature in the jet drier lowered sonic knots slightly and lowered wet knots also. Post cure time increased wet knots and may have increased sonic knots. The level of sonic knots is considerably higher than untreated pulp indicating that the polyacrylic acid treatment increases knots. Rewetting the crosslinked pulp and drying in an oven showed that the pulp did not bond to itself indicating crosslinking of the pulp.

TABLE 13

Five percent polyacrylic acid treated pulp.

| Run # | Sample Preparation | Post Cure Time (min) | Sonic Knots | Wet Knots (% Rejects) | Accepts | Fines | Inlet Temp. (° C.) | Outlet Temp. (° C.) |
|---|---|---|---|---|---|---|---|---|
| 35a | bleached never dried w/PAA XL | 0 | 35.00 | 0.0 | 48.33 | 16.67 | 286 | 200 |
|  | bleached never dried w/PAA XL | 2 | 32.07 | 15.35 | 56.87 | 11.07 | 286 | 200 |
|  | bleached never dried w/PAA XL | 3.5 | 28.93 | 16.02 | 58.60 | 12.47 | 286 | 200 |
|  | bleached never dried w/PAA XL | 5 | 23.80 | 18.24 | 62.13 | 14.07 | 286 | 200 |
| 35b | bleached never dried w/PAA XL | 0 | 28.07 | 0.26 | 55.00 | 16.93 | 296 | 210 |
|  | bleached never dried w/PAA XL | 2 | 24.00 | 14.48 | 63.00 | 13.00 | 296 | 210 |
|  | bleached never dried w/PAA XL | 3.5 | 20.40 | 9.57 | 65.33 | 14.27 | 296 | 210 |
|  | bleached never dried w/PAA XL | 5 | 24.67 | 11.28 | 63.60 | 11.73 | 296 | 210 |

Example 14

Clay and fly ash treated bleached singulated fiber was produced with the drying system described above to determine the effect on sonic knots. The clay and fly ash was added at 0%, 1%, and 10% by weight. The samples with 10% mineral have less knots. The fly ash containing fibers had lower knots than the clay containing fibers at the same dosage. The samples with 1% mineral do not appear much different than the control. Table 14 provides a summary of the data.

TABLE 14

Runs to determine effect of clay and fly ash on knots.

| Run # | Sample Preparation | Mineral % | Knots | Accepts | Fines | Inlet Temp. (° C.) | Outlet Temp. (° C.) |
|---|---|---|---|---|---|---|---|
| 38 | Control, wet lap centrifuged As is | 0 | 19.13 | 65.80 | 15.07 | 270 | 180 |
| 39 | Control, wet lap centrifuged With Clay | 1 | 23.87 | 63.87 | 12.27 | 270 | 180 |
| 40 | Control, wet lap centrifuged With Clay | 10 | 10.07 | 71.27 | 18.67 | 270 | 180 |
| 41 | Control, wet lap centrifuged With Fly Ash | 1 | 15.93 | 68.00 | 16.07 | 270 | 180 |

TABLE 14-continued

Runs to determine effect of clay and fly ash on knots.

| Run # | Sample Preparation | Mineral % | Knots | Ac- cepts | Fines | Inlet Temp. (° C.) | Outlet Temp. (° C.) |
|---|---|---|---|---|---|---|---|
| 42 | Control, wet lap centrifuged With Fly Ash | 10 | 4.00 | 69.20 | 26.80 | 270 | 180 |

Example 15

Singulated fiber was produced using the drying system described above from bleached Douglas fir pulp. The pulp was prepared by centrifuging and then running the pulp through the drier system cold to break apart the wet chunks of pulp and then feeding the broken apart pulp through the drier system hot as normal. The purpose is to determine the efficiency of the drier system to prepare pulp for singulation. The effect of outlet temperature on singulation was also tested. Outlet temperature is changed by changing feed rate. At the same outlet temperature, the cold then hot run through the drier reduced knots by half. Increasing outlet temperature reduces knots significantly. The results are shown in Table 15.

TABLE 15

Jet drier runs to determine the effect of running fiber through the drier system with no heat and then running the same fiber through the system hot.

| Run # | Sample Preparation | Sonic Knots | Accepts | Fines | Inlet Temp. (° C.) | Outlet Temp. (° C.) | Conveyor Speed (hz) |
|---|---|---|---|---|---|---|---|
| 46a | Control, wet lap centrifuged (twice through - cold then hot) | 20.13 | 64.93 | 14.93 | 260 | 170 | 4.0 |
| 46b | Control, wet lap centrifuged (twice through - cold then hot) | 7.87 | 76.80 | 15.33 | 260 | 197 | 3.0 |
| 46c | Control, wet lap centrifuged (twice through - cold then hot) | 8.53 | 76.73 | 14.73 | 260 | +200 | 2.25 |
| 47 | Control, wet lap centrifuged (once through - hot only) | 14.53 | 70.67 | 14.80 | 260 | 198 | 3.5 |

Example 16

Singulated fiber was produced using the drying system described above from unbleached Douglas fir pulp. The pulp was prepared by centrifuging it in a batch centrifuge. Sonic knots ranged from 2% to 5% over a several hour period indicating good system stability. The results are shown in Table 16, where "run ave" is the mean average of all six (46a–46f) runs.

TABLE 16

Jet drier runs to determine system stability.

| Run # | Time into run | Sonic Knots | Accepts | Fines | Inlet Temp. (° C.) | Outlet Temp. (° C.) |
|---|---|---|---|---|---|---|
| 48 | Run ave | 4.5 | 84.3 | 11.2 | 260 | 160 |
| 48a | (1 hour) | 5 | 83 | 12 | 260 | 160 |
| 48b | (2 hour) | 4 | 85 | 11 | 260 | 160 |
| 48c | (3 hour) | 6 | 84 | 10 | 260 | 160 |
| 48d | (4 hour) | 2 | 87 | 11 | 260 | 160 |
| 48e | (5 hour) | 5 | 84 | 11 | 260 | 160 |
| 48f | (6 hour) | 5 | 83 | 12 | 260 | 160 |

Example 17

Singulated fiber was produced using the drying system described above from bleached and unbleached Douglas fir and bleached Southern pine pulp. The pulp was prepared by centrifuging it in a batch centrifuge. A material handling fan was used to break apart the pulp prior to drying it. Steam heat was used to prepare selected pulps. Different outlet temperatures were also run. The results are shown in Table 17. Steam heating the pulp prior to drying reduced knots. A higher outlet temperature reduces knots. Unbleached pulp had the lowest amount of knots.

TABLE 17

Runs to compare bleached and unbleached Douglas fir and bleached Southern pine singulated fibers, as well as steam treatment.

| Run # | Pulp | Sample Preparation | Kappa | Sonic Knots | Accepts | Fines | Inlet Temp. (° C.) | Outlet Temp. (° C.) |
|---|---|---|---|---|---|---|---|---|
| 50a | SP | Never-dried, bleached, slushed, centrifuged, material handling fan | 0 | 14.80 | 69.73 | 15.47 | 260 | 160 |
| 50c | SP | Never-dried, bleached, slushed, centrifuged, material handling fan, steam heat | 0 | 5.13 | 73.07 | 21.80 | 250 | 200 |
| 50d | SP | Never-dried, bleached, slushed, centrifuged, material handling fan, steam heat | 0 | 4.00 | 75.80 | 20.20 | 260 | 220 |
| 51a | U-DF | Never-dried, unbleached, centrifuged, material handling fan | 25 | 2.60 | 85.67 | 11.73 | 260 | 160 |
| 52 | B-DF | Control, wet lap centrifuged | 0 | 16.20 | 70.73 | 13.07 | 260 | 160 |
| 52a | B-DF | Control, wet lap, centrifuged, steam heat | 0 | 13.13 | 75.67 | 11.20 | 230 | 180 |
| 52b | B-DF | Control, wet lap, centrifuged, steam heat | 0 | 8.40 | 75.33 | 16.27 | 250 | 200 |
| 52c | B-DF | Control, wet lap, centrifuged, steam heat | 0 | 10.53 | 77.27 | 12.20 | 260 | 220 |

Example 18

Singulated fiber was produced using the drying system described above from bleached Douglas fir and bleached Southern pine pulp. The pulp was prepared by centrifuging it in a batch centrifuge. A material handling fan was used to break apart the pulp prior to drying it. Passing the pulp through the jet drier system with the heat off was done on selected samples. The results are shown in Table 18. Sonic knots ranged from 1.87 to 10.07. Running the pulp through the system with the heat off prior to drying the pulp reduced knots.

TABLE 18

Bleached Douglas fir and Southern pine with no treatment but with selected defiberization.

| Run # | Pulp | Sample Preparation | Sonic Knots | Accepts | Fines | Inlet Temp. (° C.) | Outlet Temp. (° C.) | Null |
|---|---|---|---|---|---|---|---|---|
| 53a | B-SP | Never dried, bleached, slushed, centrifuged, material handling fan Run twice - cold/hot | 1.87 | 79.93 | 18.20 | 250 | 185 | −3.5–4.0 |

TABLE 18-continued

Bleached Douglas fir and Southern pine with no treatment but with selected defiberization.

| Run # | Pulp | Sample Preparation | Sonic Knots | Accepts | Fines | Inlet Temp. (° C.) | Outlet Temp. (° C.) | Null |
|---|---|---|---|---|---|---|---|---|
| 53a2 | B-SP | Never-dried, bleached, slushed, centrifuged, material handling fan Hot only | 10.07 | 72.60 | 17.3 | 250 | 177 | −3.5 |
|  |  | 53a2 sub sample - 1 | 9.87 | 75.33 | 14.8 |  |  |  |
|  |  | 53a2 sub sample - 2 | 6.87 | 74.87 | 18.2 |  |  |  |
|  |  | 53a2 sub sample - 3 | 9.33 | 73.47 | 17.2 |  |  |  |
| 53b | B-SP | Never-dried, bleached, slushed, centrifuged, material handling fan Hot only | 9.40 | 72.40 | 18.2 | 250 | 171 | −3.5 |
| 54a | B-DF | Control, wet lap bleached, centrifuged, material handling fan Run twice - cold/hot | 3.00 | 82.20 | 14.80 | 250 |  | −5 |
| 54a2 | B-DF | Control, wet lap, bleached, centrifuged, material handling fan Run twice - cold/hot | 5.87 | 80.73 | 13.40 | 250 | 177 | −3.5–4.0 |
| 54b | B-DF | Control, wet lap, bleached, centrifuged, material handling fan Hot only | 9.80 | 77.67 | 12.53 | 250 | 171 | −3.5 |

Example 19

Singulated fiber was produced using the drying system described above from bleached Douglas fir treated with 0.1% sodium dodecyl sulfate. The pulp was prepared by centrifuging it in a batch centrifuge after treatment. Passing the pulp through the jet drier system with the heat off was done on the samples. The results are shown in Table 19. Sonic knots ranged from 0.73 to 2.27% indicating that surfactant treatment significantly reduces sonic knots.

Example 20

Singulated fiber was produced using the drying system described above from bleached Southern pine (B-SP) with and without latex treatment and from unbleached and bleached Douglas fir (U-DF and B-DF, respectively) pulp. The bleached Southern pine pulp was prepared by centrifuging slushed pulp, running it through a material handling fan, and then running it through the jet drier with the heat off prior to drying it. The unbleached Douglas fir was only centrifuged after slushing. The latex treated bleached South-

TABLE 19

Runs on bleached Douglas fir pulp treated with 0.1% sodium dodecyl sulfate.

| Run # | Sample Preparation | Amount (kg) | Sonic Knots | Accepts | Fines | Inlet Temp. (° C.) | Outlet Temp. (° C.) |
|---|---|---|---|---|---|---|---|
| 55 | Control, wet lap bleached, slushed in 0.1% solution of SDS, centrifuged only Run twice - cold then hot | 3 separate bags for testing | 1.07 0.73 0.73 | 84.40 83.80 84.00 | 14.53 15.47 15.27 | 250 | 180 |
| 56 | Control, wet lap bleached, slushed, centrifuged, material handling fan Run twice - cold then hot | 3 separate bags for testing | 1.33 2.27 0.87 | 85.00 83.93 85.07 | 13.67 13.80 14.07 | 240 | 170 |
| 57 | Control, wet lap bleached, slushed in 0.1% solution of SDS, centrifuged only Run twice - cold then hot | 3 separate bags for testing | 1.00 1.00 1.00 | 83.13 83.67 83.93 | 15.87 15.33 15.07 | 240 | 170 | ern pine pulps were prepared by passing the pulps through the jet drier system with the heat off after treatment and centrifuging. The bleached Douglas fir control pulp was only centrifuged after slushing. The results are shown in Table 20. Sonic knots are low on the bleached Southern pine indicating the mechanical treatments reduce knots. The unbleached Douglas fir pulp had the lowest knots indicating that it fiberizes well in this system. The latex treated pulps also had low knots showing that the latex may reduce knots or may not affect their production. The control bleached Douglas fir had low knots indicating an improvement in the drier system. The latex treated pulps were hydrophobic.

TABLE 16

Jet drier runs to determine system stability.

| Run # | Pulp | Sample Preparation | Sonic Knots | Accepts | Fines | Inlet Temp. (° C.) | Outlet Temp. (° C.) |
|---|---|---|---|---|---|---|---|
| 58 | B-SP | Bleached, never-dried, slushed, centrifuged, material handling fan Run twice - cold then hot | 1.07<br>1.67<br>3.67 | 81.07<br>79.40<br>78.53 | 17.87<br>18.93<br>17.80 | 240 | 167–170 |
| 59 | U-DF | centrifuged only Run hot only | 0.80 | 85.73 | 13.47 | 240 | 167–170 |
| 60 | B-SP | Latex #1 Run twice - cold and hot | 1.27 | 88.20 | 10.53 | 240 | 160–165 |
| 61 | B-SP | Latex #2 Run twice - cold and hot | 1.60 | 84.00 | 14.40 | 240 | 160–165 |
| 62 | B-SP | Latex #3 Run twice - cold and hot | 1.33 | 84.60 | 14.07 | 240 | 160–165 |
| 63 | B-SP | Latex #4 Run twice - cold and hot | 1.07 | 84.93 | 14.00 | 240 | 160–165 |
| 64 | B-DF | Control, wet lap bleached, slushed, centrifuged only | 2.20 | 83.67 | 14.13 | 240 | 167–170 |

Example 21

Singulated fiber was produced using the drying system described above from bleached Douglas fir pulp. The pulps were prepared by centrifuging only, centrifuging and running through a material handling fan, centrifuging and running through the drier with the heat off before drying or adding chemical surfactant prior to centrifuging. The results are in Table 21. Pulp that had been centrifuged or centrifuged and run in the material handling fan were about equal in sonic knots at 15%. Running centrifuged pulp through the system with no heat reduced knots to about 10%. The surfactant treatment reduced knots to about 3%. These results were duplicated in follow-up runs. Conveyor speed was 7 ft/min, null was −3.5 to −4 inches water.

TABLE 21

Singulated bleached Douglas fir pulp comparing mechanical fiberization pulp preparation to Berol 587k chemical surfactant.

| Run # | Sample Preparation | Sonic Knots | Accepts | Fines | Inlet Temp. (° C.) | Outlet Temp. (° C.) | Feed Rate |
|---|---|---|---|---|---|---|---|
| 65 | Control, wet lap bleached, slushed, centrifuged, material handling fan Hot only | 15.33 | 71.47 | 13.20 | 260 | 180 | 150 |
| 66 | Control, wet lap bleached, slushed, centrifuged only, Cold then Hot | 9.93 | 76.13 | 13.93 | 260 | 180 | 150 |
| 67 | Control, wet lap bleached, slushed, centrifuged with 1% surfactant Hot only | 2.88 | 85.80 | 11.32 | 260 | 180 | 150 |

TABLE 21-continued

Singulated bleached Douglas fir pulp comparing mechanical
fiberization pulp preparation to Berol 587k chemical surfactant.

| Run # | Sample Preparation | Sonic Knots | Accepts | Fines | Inlet Temp. (° C.) | Outlet Temp. (° C.) | Feed Rate |
|---|---|---|---|---|---|---|---|
| 68 | Control, wet lap bleached, slushed, centrifuged only, Hot only | 15.62 | 72.03 | 12.35 | 260 | 180 | 150 |

Example 22

Singulated fiber was produced using the drying system described above from bleached Douglas fir pulp and Southern pine pulp with and without polyacrylic acid crosslinker, surfactant, and clay treatments. The pulps were prepared by centrifuging only or centrifuging and running through a material handling fan (MHF) prior to drying. The results are in Table 22. The Douglas fir control had 9% knots. The Southern pine with surfactant had 2% knots confirming the benefit of surfactant. The polyacrylic acid only treatment increased knots to 15%. Adding surfactant or clay to the polyacrylic acid treated pulp reduced knots below 2% demonstrating the benefit of surfactant and clay to reduce knots. The inlet temperature was 240° C. and outlet temperature was 165° C. Null was −3.5 inches of water and conveyor speed was 6.0 ft/min.

TABLE 22

Singulated bleached Douglas fir control and Southern pine pulp
with and without polyacrylic acid, surfactant, and clay treatments.

| Run # | Pulp | Sample Preparation | Clay | Knots | Accepts | Fines | OD Feed Rate (g/min) |
|---|---|---|---|---|---|---|---|
| 75 | B-DF | Control, wet lap centrifuged Hot only | 0 | 9.00 | 79.47 | 11.53 | 71.02 |
| 76 | B-SP | Bleached, never-dried, slushed, centrifuged, MHF, with 1% surfactant | 0 | 2.07 | 84.93 | 13.00 | 83.15 |
| 77 | B-SP | Bleached, never-dried, slushed, centrifuged, MHF, w/20% PAA on fiber | 0 | 14.87 | 65.80 | 19.33 | 92.63 |
| 78 | B-SP | Bleached, never-dried, slushed, centrifuged, MHF, w/20% PAA on fiber and with 1% surfactant | 0 | 1.60 | 85.40 | 13.00 | 89.71 |
| 79 | B-SP | Bleached, never-dried, slushed, centrifuged, MHF, w/20% PAA on fiber | 10 | 1.20 | 77.80 | 21.00 | 88.07 |
| 80 | B-SP | Bleached, never-dried, slushed, centrifuged, MHF, w/20% PAA on fiber | 20 | 1.80 | 76.67 | 21.53 | 86.91 |

Example 23

Singulated fiber was produced using the drying system described above from two different bleached Douglas fir pulps with selected amounts of Berol 587k surfactant on one of the pulps. One batch of pulp was treated with soluble iron. The pulps were prepared by centrifuging only. The results are in Table 23. The surfactant works best at the 1% dosage level. The iron reduced knots significantly but also increased fines to a high level. Feed rate may have had an influence on the surfactant results. Higher feed rates appear to increase knots. The inlet temperature was 240 C. and outlet was 160 C. The conveyor speed was 6 ft/min and null was −3.5 inches water.

TABLE 23

Run to determine minimum amount of surfactant needed to reduce knot content below 2% using the bleached KKT from Kamloops.

| Run # | Pulp | Sample Preparation | % Surfactant | Sonic Knots | Accepts | Fines | OD Feed Rate (g/min) |
|---|---|---|---|---|---|---|---|
| 85 | B-DF#2 | Control, slushed, centrifuged only Hot only | 0 | 4.20 | 82.07 | 13.73 | 75.80 |
| 86 | B-DF#2 | Slushed, centrifuged, w/surfactant, centrifuged Hot only | 0.1 | 4.13 | 81.00 | 14.87 | 108.32 |
| 87 | B-DF#2 | Slushed, centrifuged, w/surfactant, centrifuged Hot only | 0.5 | 3.73 | 84.33 | 11.93 | 90.51 |
| 88 | B-DF#2 | Slushed, centrifuged, w/surfactant, centrifuged Hot only | 1.0 | 2.00 | 86.27 | 11.73 | 73.25 |
| 89 | B-DF | Wet lap centrifuged (bleached) with 0.05% $Fe^{3+}$ | 0 | 1.93 | 65.27 | 32.80 | 71.90 |
| 90 | B-DF | Control, wet lap bleached, slushed, centrifuged - end of run sample Hot only | 0 | 5.00 | 80.67 | 14.33 | 71.56 |

Example 24

Singulated fiber was produced using the drying system described above from bleached Douglas fir pulp that had been dewatered using a screwpress. The results are in Table 24. The amount of knots is sufficiently low compared to previous runs to show that screwpress dewatering is an acceptable option to remove excess water prior to drying pulp with the jet drier system.

TABLE 24

Singulated bleached Douglas fir prepared from pulp dewatered through a screwpress.

| Run # | Sample Preparation | Sonic Knots | Accepts | Fines | Inlet Temp. (° C.) | Outlet Temp. (° C.) | Null |
|---|---|---|---|---|---|---|---|
| 91 | Control, wet lap bleached, slushed, centrifuged, material handling fan Cold then Hot | 3.20 | 85.87 | 10.93 | 240 | 189–190 | −3.5 |
| 92 | Never-dried, Screw pressed (HC > 30), material handling fan Hot only | 3.87 | 82.33 | 13.80 | 240 | 169–171 | −3.5 to −4.0 |

Examples 25–29

The pulps used in Examples 25 through 29 were all never-dried pulps of approximately 10% consistency shipped directly from the pulp mill in plastic-lined fiber drums. The procedure for preparing and treating the pulp with crosslinking chemicals included the steps of: (a) centrifuging the never-dried pulp to a uniform consistency of approximately 34%, (b) treating the pulp with crosslinking chemicals in a large Hobart mixer at a consistency of approximately 5%, (c) centrifuging the treated pulp to a consistency of approximately 36% (higher now due to retained chemical solids), and (d) delumping the centrifuged, treated pulp in the Hobart mixer to achieve uniform particle size.

In all the examples, the jet drier system as described above was used to singulate and dry the fibers. After passing through the jet drier, the dry singulated fibers were first collected and then cured in an oven. Crosslinking was only partially effected in the jet drier. Crosslinking was completed by curing the treated fiber for several minutes at an elevated temperature in a curing oven.

Testing of crosslinked fiber often includes sonic fractionation to determine the percentage of knots, accepts, and fines as described above.

The primary attributes of crosslinked fiber are high bulk and retention of bulk when wet. The FAQ test is used for measuring both wet and dry bulks. "Resaturation bulk at 0.6 kPa" is usually the test result that is of most interest and is the value used when FAQ results are listed in the examples. FAQ's for commercially available crosslinked fiber typically range from 13.5 to 19.0 cc/g with higher values being preferred.

Example 25

In this example, bleached, never-dried, Southern Pine was used. The crosslinker was DMDHEU. The post-jet drier cure time was about 5 minutes at 170° C.

TABLE 25

Singulated Pulp Crosslinked With DMDHEU

| Run # | Crosslink (% ODF) | Manifold Temp. (C.) | Outlet Temp. (C.) | Null Press. (in of $H_2O$) | Knots (%) | Accepts (%) | Fines (%) | FAQ (cc/g) |
|---|---|---|---|---|---|---|---|---|
| 91 | 2.0 | 220 | 135 | −4.5 | 4.0 | 79.3 | 16.7 | 13.6 |
| 92 | 3.0 | 220 | 132 | −4.5 | 4.3 | 79.0 | 16.7 | 13.6 |
| 93 | 4.0 | 220 | 135 | −4.5 | 4.1 | 78.9 | 17.0 | 13.6 |
| 94 | 2.0 | 200 | 115 | −4.5 | 4.3 | 80.2 | 15.5 | 13.7 |
| 95 | 3.0 | 200 | 112 | −4.5 | 5.0 | 79.7 | 15.3 | 13.6 |
| 96 | 4.0 | 200 | 113 | −4.5 | 4.8 | 77.6 | 17.6 | 13.8 |

Example 26

In this example, bleached, never-dried, Southern Pine pulp was used. The crosslinker was citric acid. The post-drier cure time was about 5 minutes at 170° C.

TABLE 26

Singulated Pulp Crosslinked With Citric Acid

| Run # | Crosslink (% ODF) | Manifold Temp. (C.) | Outlet Temp. (C.) | Null Press. (in of $H_2O$) | Knots (%) | Accepts (%) | Fines (%) | FAQ (cc/g) |
|---|---|---|---|---|---|---|---|---|
| 97 | 5.7 | 200 | 110 | −4.5 | 4.1 | 79.9 | 16.0 | 15.1 |
| 98 | 5.7 | 200 | 112 | −4.0 | 4.7 | 81.2 | 14.1 | 14.9 |
| 99 | 5.7 | 200 | 113 | −4.0 | 3.7 | 82.6 | 13.7 | 15.1 |
| 100 | 11.5 | 200 | 113 | −4.5 | 5.2 | 81.5 | 13.3 | 16.3 |
| 101 | 11.5 | 200 | 113 | −4.5 | 3.9 | 83.6 | 12.5 | 16.2 |
| 102 | 11.5 | 200 | 116 | −4.0 | 3.6 | 82.9 | 13.5 | 16.0 |

Example 27

In this example, bleached, never-dried, Southern Pine was used. The crosslinker was Malic acid. The post-drier cure time was about 20 minutes at 185° C.

TABLE 27

Singulated Pulp Crosslinked With Malic Acid

| Run # | Crosslink (% ODF) | Manifold Temp. (C.) | Outlet Temp. (C.) | Null Press. (in of $H_2O$) | Knots (%) | Accepts (%) | Fines (%) | FAQ (cc/g) |
|---|---|---|---|---|---|---|---|---|
| 103 | 10.0 | 180 | 106 | −2.0 | 5.5 | 77.9 | 16.6 | 16.1 |
| 104 | 10.0 | 180 | 108 | −4.5 | 3.7 | 79.4 | 16.9 | 16.3 |
| 105 | 10.0 | 200 | 127 | −2.0 | 4.2 | 80.9 | 14.9 | 16.1 |
| 106 | 10.0 | 200 | 123 | −4.5 | 3.7 | 82.4 | 13.9 | 16.3 |
| 107 | 10.0 | 220 | 130 | −1.5 | 4.0 | 80.9 | 15.1 | 16.3 |
| 108 | 10.0 | 220 | 135 | −4.5 | 3.9 | 81.0 | 15.1 | 16.3 |
| 109 | 10.0 | 220 | 129 | −6.0 | 3.9 | 82.9 | 13.2 | 16.4 |

Example 28

In this example, unbleached, never-dried, Southern Pine was noted. The crosslinker was Malic acid. The post-drier cure time was about 4 minutes at 200° C.

TABLE 28

Singulated Pulp Crosslinked With Malic Acid

| Run # | Crosslink (% ODF) | Manifold Temp. (C.) | Outlet Temp. (C.) | Null Press. (in of $H_2O$) | Knots (%) | Accepts (%) | Fines (%) | FAQ (cc/g) |
|---|---|---|---|---|---|---|---|---|
| 110 | 10.0 | 185 | 106 | −4.5 | 0.3 | 87.3 | 12.4 | 17.6 |
| 111 | 10.0 | 185 | 100 | −6.5 | 0.5 | 88.4 | 11.1 | 18.0 |
| 112 | 10.0 | 200 | 116 | −4.5 | 0.7 | 87.8 | 11.5 | 17.9 |
| 113 | 10.0 | 200 | 110 | −6.0 | 0.3 | 87.7 | 12.0 | 18.1 |
| 114 | 10.0 | 185 | 124 | −5.5 | 0.7 | 86.2 | 13.1 | 17.8 |

Example 29

In this example, unbleached, never-dried, Southern Pine was used. The crosslinker was Malic acid. The post-drier cure time was 4 minutes at 200° C.

TABLE 29

Singulated Pulp Crosslinked With Malic Acid

| Run # | Crosslink (% ODF) | Manifold Temp. (C.) | Outlet Temp. (C.) | Null Press (in of $H_2O$) | Knots (%) | Accepts (%) | Fines (%) | FAQ (cc/g) |
|---|---|---|---|---|---|---|---|---|
| 115 | 2.0 | 200 | 118 | −5.5 | 2.0 | 84.1 | 13.9 | 15.9 |
| 116 | 4.0 | 200 | 118 | −5.5 | 2.2 | 84.4 | 13.4 | 17.1 |
| 117 | 6.0 | 200 | 119 | −5.0 | 2.0 | 83.0 | 15.0 | 17.3 |
| 118 | 8.0 | 200 | 118 | −5.0 | 1.3 | 83.8 | 14.9 | 17.9 |

While the preferred embodiment of the invention has been illustrated and described, it will be appreciated that various changes can be made therein without departing from the spirit and scope of the invention.

What is claimed is:

1. A process for producing crosslinked, singulated pulp fibers comprising:
    treating never-dried wet pulp received directly from a pulp mill with a crosslinker;
    introducing said never-dried wet pulp directly from a pulp mill and air into a jet drier;
    thereafter drying and crosslinking said pulp in said jet drier to form singulated pulp fibers; and removing said pulp from said jet drier and separating said dried pulp fibers from said air in said jet drier, thereby producing a crosslinked singulated pulp fibers having knots, fines and accepts.

2. The process of claim 1, wherein said crosslinker is selected from the group consisting of polyacrylic acid, glyoxal, malic acid, and tartaric acid.

3. The process of claim 1, wherein said wet pulp is at least partially dewatered prior to introducing said pulp into said drier.

4. The process of claim 1, wherein said wet pulp is further treated with a treatment substance to reduce the knot content of said pulp fibers, selected from the group consisting of a surfactant and a mineral particulate.

5. The process of claim 4, wherein said treatment substance is a mineral particulate.

6. The process of claim 5, wherein the knot count of said dried pulp fibers are less than or equal to 2%, the accepts in said dried pulp fibers are greater than or equal to 77%, and the fines in said dried pulp fibers are less than or equal to 21%.

7. The process of claim 5, wherein said treatment substance is a surfactant.

8. The process of claim 4, wherein said dried pulp fibers have a knot count less than 15%.

9. The process of claim 8, wherein said dried pulp fibers have a knot count less than 10%.

10. The process of claim 8, wherein said dried pulp fibers have a knot count less than 5%.

11. The process of claim 8, wherein said dried pulp fibers have a knot count less than 2%.

12. The process of claim 7, wherein the knot count of said dried pulp fibers are less than or equal to 5%, the accepts in said dried pulp fibers are greater than or equal to 80%, and the fines in said dried pulp fibers are less than or equal to 15%.

13. The process of claim 7, wherein the knot count of said dried pulp fibers is less than or equal to 5%, the accepts in said dried pulp fibers are greater than or equal to 80%, and the fines in said dried pulp fibers are less than or equal to 13%.

14. The process of claim 7, wherein the knot count of said dried pulp fibers is less than or equal to 5%, the accepts in said dried pulp fibers are greater than or equal to 85%, and the fines in said dried pulp fibers are less than or equal to 15%.

15. The process of claim 7, wherein the knot count of said dried pulp fibers is less than or equal to 2%, the accepts in said dried pulp fibers are greater than or equal to 80%, and the fines in said dried pulp fibers are less than or equal to 15%.

16. The process of claim 1, wherein said wet pulp is further treated with a substance selected from the group consisting of a hydrophobic material, a superplasticizer, a foam, a surfactant and a water reducing agent.

17. The process of claim 1, wherein the knot count of said dried pulp fibers is less than 15%.

18. The process of claim 17, wherein the knot count of said dried pulp fibers is less than 10%.

19. The process of claim 17, wherein the knot count of said dried pulp fibers is less than 5%.

20. The process of claim 17, wherein the knot count of said dried pulp fibers is less than 2%.

21. The process of claim 1, wherein the knot count of said dried pulp fibers is less than or equal to 5%, the accepts in said dried pulp fibers are greater than or equal to 80%, and the fines in said dried pulp fibers are less than or equal to 15%.

22. The process of claim 1, wherein the knot count of said dried pulp fibers is less than or equal to 5%, the accepts in said dried pulp fibers are greater than or equal to 80%, and the fines in said dried pulp fibers are less than or equal to 13%.

23. The process of claim 1, wherein the knot count of said dried pulp fibers is less than or equal to 5%, the accepts in said dried pulp fibers are greater than or equal to 85%, and the fines in said dried pulp fibers are less than or equal to 15%.

24. The process of claim 1, wherein the knot count of said dried pulp fibers is less than or equal to 2%, the accepts in said dried pulp fibers are greater than or equal to 80%, and the fines in said dried pulp fibers are less than or equal to 15%.

25. The process of claim 1, wherein said supply pulp has a consistency of from 0.01% to 10% before introduction into said jet drier.

26. The process of claim 25, wherein said supply pulp has a consistency of from 3% to 10% before introduction into said drier.

27. The process of claim 1, wherein said singulated pulp is dried to a moisture content of 2 percent to 10 percent by weight.

28. A process for producing crosslinked, singulated pulp fibers comprising:
   treating never-dried wet pulp received directly from a pulp mill with a crosslinker;
   introducing air and said never-dried wet pulp directly from a pulp mill without mechanical defibering into a jet drier;
   thereafter drying said pulp in said jet drier to form singulated pulp fibers; and
   removing said pulp from said jet drier and separating said dried pulp fibers from said air in said jet drier, thereby producing a crosslinked singulated pulp fibers having knots, fines and accepts.

* * * * *